(12) United States Patent
Baba

(10) Patent No.: US 11,402,581 B2
(45) Date of Patent: Aug. 2, 2022

(54) MODE CONVERTER

(71) Applicant: Fujitsu Optical Components Limited, Kawasaki (JP)

(72) Inventor: Takeshi Baba, Tsukuba (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/241,190

(22) Filed: Apr. 27, 2021

(65) Prior Publication Data

US 2021/0382233 A1    Dec. 9, 2021

(30) Foreign Application Priority Data

Jun. 9, 2020    (JP) .............................. JP2020-100352

(51) Int. Cl.
   *G02B 6/14*    (2006.01)
   *G02B 6/126*    (2006.01)
   *G02B 6/12*    (2006.01)

(52) U.S. Cl.
   CPC ............... *G02B 6/14* (2013.01); *G02B 6/126* (2013.01); *G02B 2006/12097* (2013.01)

(58) Field of Classification Search
   None
   See application file for complete search history.

(56) References Cited

U.S. PATENT DOCUMENTS

| | | | | |
|---|---|---|---|---|
| 9,557,482 B2 * | 1/2017 | Oka | ..................... | G02B 6/2726 |
| 9,851,504 B2 | 12/2017 | Oka | | |
| 9,915,781 B1 * | 3/2018 | Lin | ......................... | G02B 6/14 |
| 9,977,187 B2 * | 5/2018 | Shi | ......................... | G02B 6/125 |
| 10,101,532 B1 * | 10/2018 | Lin | ......................... | G02B 6/126 |
| 10,133,002 B2 * | 11/2018 | Lin | ......................... | G02B 6/126 |
| 10,241,273 B2 * | 3/2019 | Tu | ........................ | G02B 6/2766 |
| 10,401,566 B2 * | 9/2019 | Park | ...................... | G02B 6/126 |
| 10,488,590 B2 * | 11/2019 | Park | ..................... | G02B 6/2766 |

(Continued)

FOREIGN PATENT DOCUMENTS

| | | |
|---|---|---|
| JP | 3-171119 | 7/1991 |
| JP | 2014/208601 A1 | 12/2014 |

(Continued)

OTHER PUBLICATIONS

Dai et al., "Novel concept for ultracompact polarization splitter-rotator based on silicon nanowires", Optics Express, vol. 19, No. 11, May 23, 2011, pp. 10940-10949.

(Continued)

*Primary Examiner* — Jerry Rahll
(74) *Attorney, Agent, or Firm* — Staas & Halsey LLP

(57) ABSTRACT

A mode converter for converting mode of propagating light is provided. The mode converter includes: a mode order conversion unit that includes an input-side first rib unit, an output-side first rib unit that extends along the input-side first rib unit, and a first slab unit arranged between the input-side first rib unit and the output-side first rib unit; and a rib channel conversion unit that includes an output-side second rib unit that is in contact with the output-side first rib unit, a second slab unit that is in contact with the first slab unit and a side surface of the output-side second rib unit, and a third slab unit that is in contact with another side surface of the output-side second rib unit.

11 Claims, 29 Drawing Sheets

(56) References Cited

U.S. PATENT DOCUMENTS

| | | | | |
|---|---|---|---|---|
| 10,677,987 | B1* | 6/2020 | Dumais | G02B 6/276 |
| 10,983,200 | B1* | 4/2021 | Shen | G01S 17/58 |
| 11,061,123 | B1* | 7/2021 | Shen | G02B 6/126 |
| 11,119,275 | B2* | 9/2021 | Park | G02B 6/12007 |
| 2014/0133796 | A1* | 5/2014 | Dong | G02B 6/126 |
| | | | | 385/11 |
| 2015/0338577 | A1* | 11/2015 | Shi | G02B 6/125 |
| | | | | 385/11 |
| 2016/0178841 | A1 | 6/2016 | Oka et al. | |
| 2017/0017033 | A1* | 1/2017 | Oka | G02B 6/125 |
| 2018/0284348 | A1* | 10/2018 | Lin | G02B 6/2766 |
| 2021/0239905 | A1* | 8/2021 | Baba | G02B 6/1228 |
| 2021/0382233 | A1* | 12/2021 | Baba | G02B 6/14 |

FOREIGN PATENT DOCUMENTS

| | | |
|---|---|---|
| JP | 2015-90449 | 5/2015 |
| JP | 2015-197664 | 11/2015 |

OTHER PUBLICATIONS

Dai et al., "Mode conversion in tapered submicron silicon ridge optical waveguides", Optics Express, vol. 20, No. 12, Jun. 4, 2012, pp. 13425-13439.

* cited by examiner

MODE CONVERTER

CROSS-REFERENCE TO RELATED APPLICATION

This application is based upon and claims the benefit of priority of the prior Japanese Patent Application No. 2020-100352, filed on Jun. 9, 2020, the entire contents of which are incorporated herein by reference.

FIELD

The embodiments discussed herein are related to a mode converter.

BACKGROUND

There have been proposed mode converters that convert $TE_1$ mode propagating light (hereinafter, referred to as $TE_1$ light) into $TE_0$ mode propagating light (hereinafter, referred to as $TE_0$ light) by using an asymmetrical directional coupler (see, Japanese Laid-open Patent Publication No. 2015-90449, Japanese Laid-open Patent Publication No. 2015-197664, U.S. Pat. No. 9,851,504, International Publication Pamphlet No. WO 2014/208601, Daoxin Dai and John E. Bowers, "Novel concept for ultracompact polarization splitter-rotator based on silicon nanowires," Optics Express, Vol. 19, No. 11, pp. 10940-10949 (2011), and Daoxin Dai, Yongbo Tang, and John E. Bowers, "Mode conversion in tapered submicron silicon ridge optical waveguides," Optics Express, Vol. 20, No. 12, pp. 13425-13439 (2012), for instance). There have also been proposed polarization rotators that convert $TM_0$ mode propagating light (hereinafter, referred to as $TM_0$ light) into $TE_0$ light by using such a mode converter and a vertically asymmetrical tapered waveguide (see, Japanese Laid-open Patent Publication No. 2015-90449, Japanese Laid-open Patent Publication No. 2015-197664, U.S. Pat. No. 9,851,504, International Publication Pamphlet No. WO 2014/208601, Daoxin Dai and John E. Bowers, "Novel concept for ultracompact polarization splitter-rotator based on silicon nanowires," Optics Express, Vol. 19, No. 11, pp. 10940-10949 (2011), and Daoxin Dai, Yongbo Tang, and John E. Bowers, "Mode conversion in tapered submicron silicon ridge optical waveguides," Optics Express, Vol. 20, No. 12, pp. 13425-13439 (2012), for instance).

The conversion efficiency from $TE_1$ light to $TE_0$ light in the asymmetrical directional coupler is able to be enhanced by providing a thin layer (hereinafter referred to as a slab layer) having a refractive index higher than that of the cladding in between the optical waveguides of the asymmetrical directional coupler (see, Japanese Laid-open Patent Publication No. 2015-90449, Japanese Laid-open Patent Publication No. 2015-197664, U.S. Pat. No. 9,851,504, and International Publication Pamphlet No. WO 2014/208601, for instance).

Note that a technique has been proposed in which a slab layer having a V-shaped tip is provided between waveguides to suppress the reflection loss of the propagating light to be inputted into a rectangular waveguide (see, Japanese Laid-open Patent Publication No. 2015-197664, U.S. Pat. No. 9,851,504, International Publication Pamphlet No. WO 2014/208601, and Japanese Laid-open Patent Publication No. H03-171119, for instance).

SUMMARY

According to an aspect of the embodiments, a mode converter includes: a substrate; a cladding on the substrate; and a core surrounded by the cladding, wherein the core has a higher refractive index than that of the cladding and includes: a mode order conversion unit configured to convert first propagating light into second propagating light of which mode order is different from a mode order of the first propagating light, and a rib channel conversion unit configured to output the second propagating light to outside; the mode order conversion unit includes: an input-side first rib unit into which the first propagating light is inputted; an output-side first rib unit that extends along the input-side first rib unit and that has a side surface on an opposite side from the input-side first rib unit, the side surface being covered with the cladding from a lower end thereof to an upper end thereof; and a first slab unit arranged between the input-side first rib unit and the output-side first rib unit, the first slab unit being thinner than the input-side first rib unit and the output-side first rib unit; and the rib channel conversion unit includes: an output-side second rib unit that is in contact with the output-side first rib unit and that outputs the second propagating light; a second slab unit that is in contact with the first slab unit and a side surface of the output-side second rib unit, and that is thinner than the output-side second rib unit; and a third slab unit that is in contact with another side surface of the output-side second rib unit and that is thinner than the output-side second rib unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described hereinafter according to the drawings. However, it is noted that the technical scope is not limited to the embodiments described below, but covers the matters described in the claims and the equivalents thereof. Here, identical symbols are given to corresponding parts and the like even in different drawings, and the description thereof will be omitted.

First Embodiment (1) Structure

Figure 1:
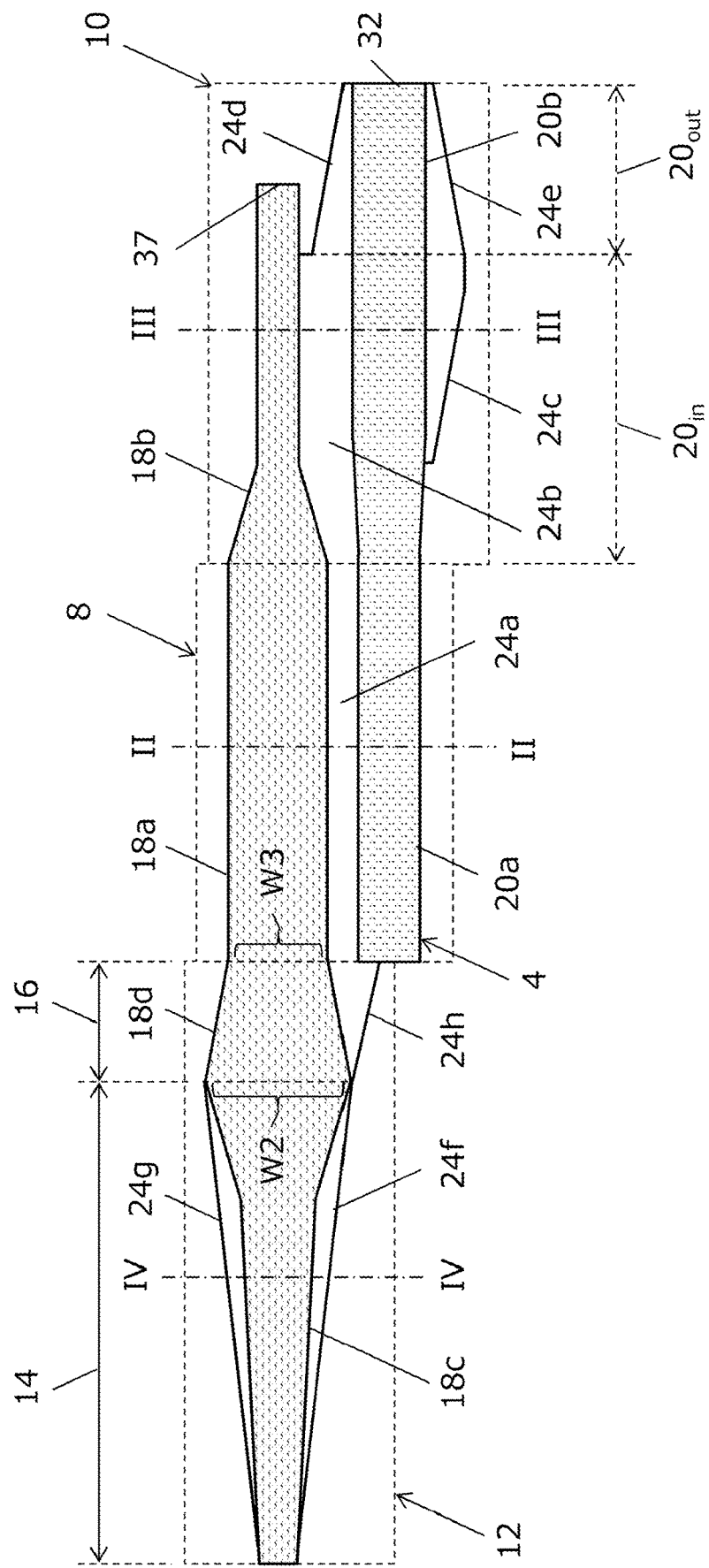
FIG. 1 is a plan view illustrating an example of a mode converter 2 according to a first embodiment.
Figure 2:
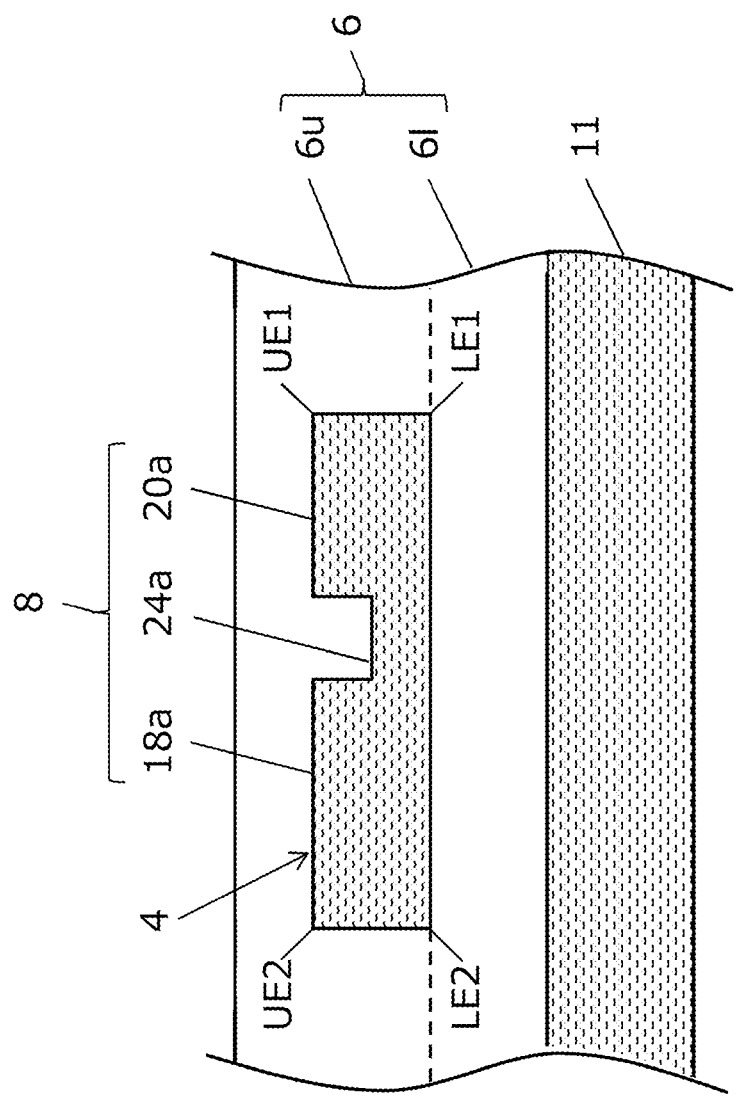
FIG. 2 is a cross-sectional view taken along line II-II of FIG. 1.
Figure 3:
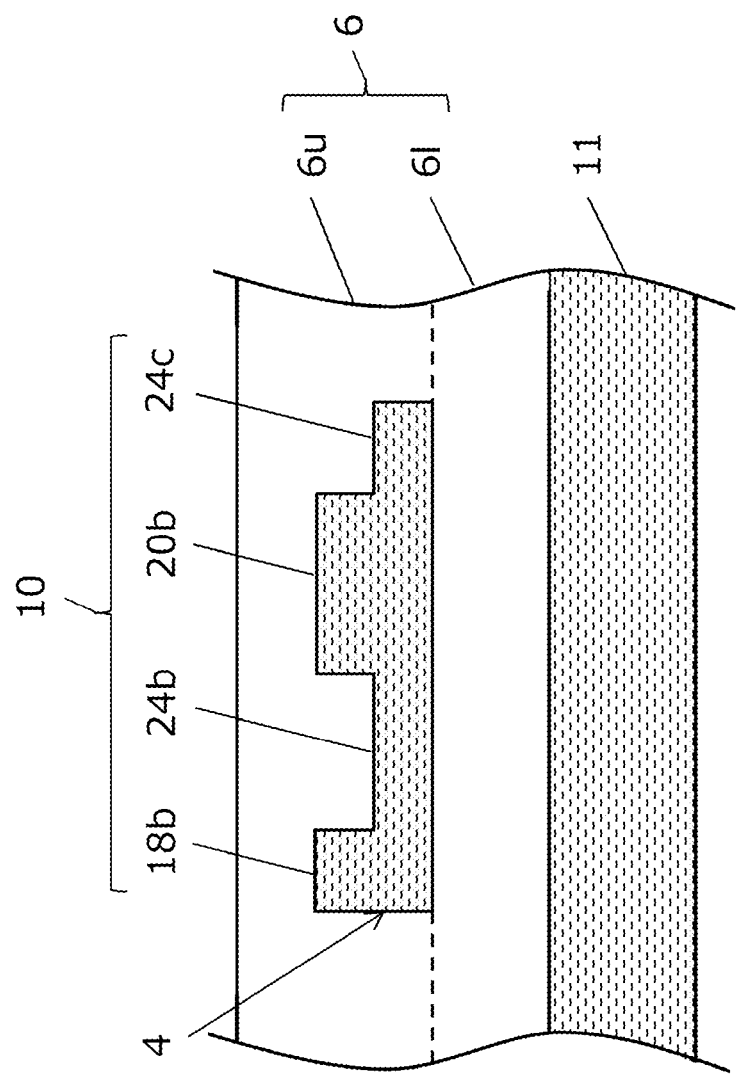
FIG. 3 is a cross-sectional view taken along line III-III of FIG. 1.
Figure 4:
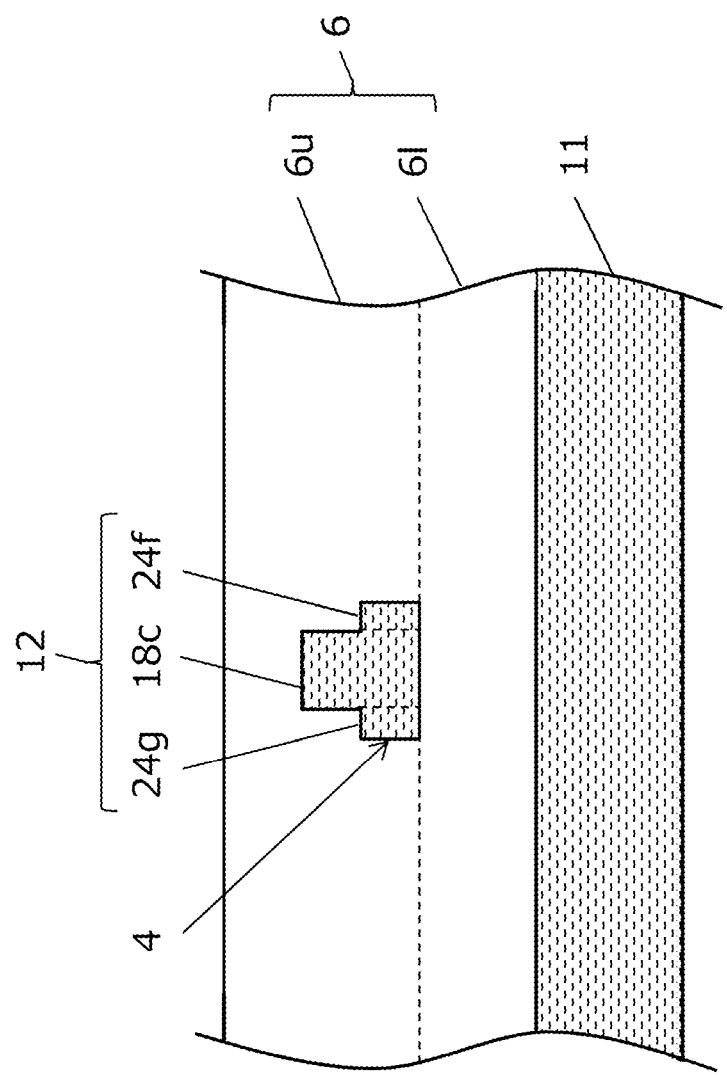
FIG. 4 is a cross-sectional view taken along line IV-IV of FIG. 1.

FIG. 1 is a plan view illustrating an example of a mode converter 2 according to a first embodiment. FIG. 2 is a cross-sectional view taken along line II-II of FIG. 1. FIG. 3 is a cross-sectional view taken along line III-III of FIG. 1. FIG. 4 is a cross-sectional view taken along line IV-IV of FIG. 1.

As illustrated in FIGS. 2 to 4, the mode converter 2 includes a substrate 11, a cladding 6 on the substrate 11, and a core 4 whose cross section is surrounded by the cladding 6. The refractive index of the core 4 is higher than that of the cladding 6. The cladding 6 includes, for instance, a lower cladding 6l on the substrate 11 and an upper cladding 6u on the lower cladding 6l. The substrate 11 is, for instance, a Si substrate. The lower cladding 6l and the upper cladding 6u are, for instance, $SiO_2$ layers.

Figure 5:
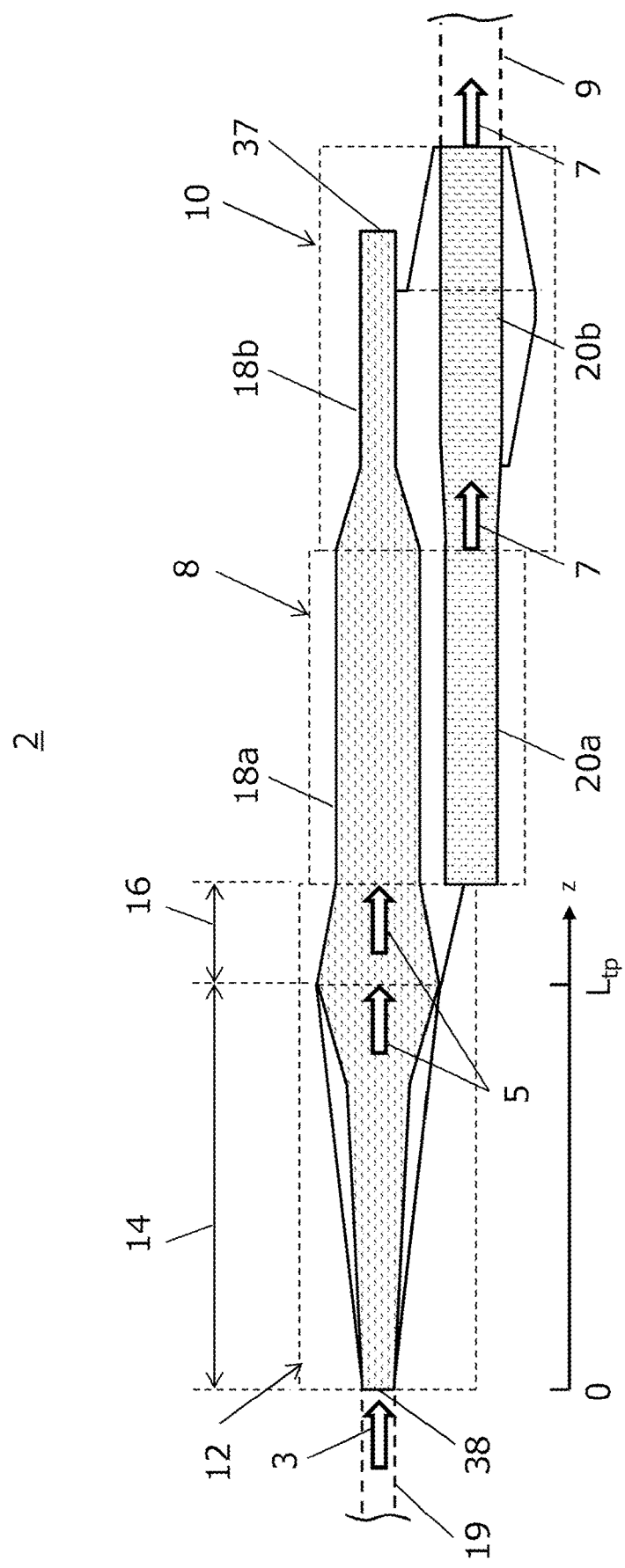
FIG. 5 is a plan view illustrating a function of the mode converter 2.

As illustrated in FIG. 1, the core 4 (a region defined by solid lines in FIG. 1) includes a mode order conversion unit 8, a rib channel conversion unit 10, and a polarization rotation unit 12. FIG. 5 is a plan view illustrating a function of the mode converter 2. The polarization rotation unit 12 receives input of $TM_0$ mode propagating light 3 (i.e., $TM_0$ light), converts the inputted $TM_0$ light 3 into $TE_1$ mode propagating light 5 (i.e., $TE_1$ light), and inputs the $TE_1$ light 5 into the mode order conversion unit 8. The propagating light is light that propagates through an optical waveguide. The mode order conversion unit 8 converts the inputted $TE_1$ light 5 into $TE_0$ mode propagating light 7 (i.e., $TE_0$ light), and inputs the propagating light 7 into the rib channel conversion unit 10.

The rib channel conversion unit 10 outputs the inputted $TE_0$ light 7 to a channel waveguide 9. At this time, the rib channel conversion unit 10 modifies the electric field distribution of the $TE_0$ light 7 so as to match with the electric field distribution of the $TE_0$ mode in the channel waveguide 9. The channel waveguide 9 is a rectangular waveguide that couples the mode converter 2 to another optical element.

—Mode Order Conversion Unit 8 (See FIG. 1)—

The mode order conversion unit 8 includes an input-side first rib unit 18a (see FIG. 1) into which the $TE_1$ light 5 (see FIG. 5) is inputted, an output-side first rib unit 20a extending along the input-side first rib unit 18a, and a first slab unit 24a arranged between the input-side first rib unit 18a and the output-side first rib unit 20a.

Of the side surfaces of the output-side first rib unit 20a, the side surface on the opposite side from the input-side first rib unit 18a is covered with the cladding 6 from a lower end LE1 (see FIG. 2) to an upper end UE1. In a same manner, of the side surfaces of the input-side first rib unit 18a, the side surface on the opposite side from the output-side first rib unit 20a is covered with the cladding 6 from a lower end LE2 (see FIG. 2) to an upper end UE2. The first slab unit 24a is a layer thinner than the input-side first rib unit 18a and the output-side first rib unit 20a.

The mode order conversion unit 8 is an asymmetrical directional coupler in which the width of the input-side first rib unit 18a is wider than the width of the output-side first rib unit 20a.

—Rib Channel Conversion Unit 10 (See FIG. 1)—

The rib channel conversion unit 10 includes an output-side second rib unit 20b in contact with the output-side first rib unit 20a, and an input-side second rib unit 18b that extends along the output-side second rib unit 20b and that is in contact with the input-side first rib unit 18a. The output-side second rib unit 20b is coupled to, for instance, the channel waveguide 9 (see FIG. 5) having a core whose cross section is rectangular. In this case, the output-side second rib unit 20b outputs the $TE_0$ light 7 to the channel waveguide 9. Of both ends of the output-side second rib unit 20b, one end in contact with the channel waveguide 9 preferably has a width equal to the width of the core of the channel waveguide 9.

Figure 6:
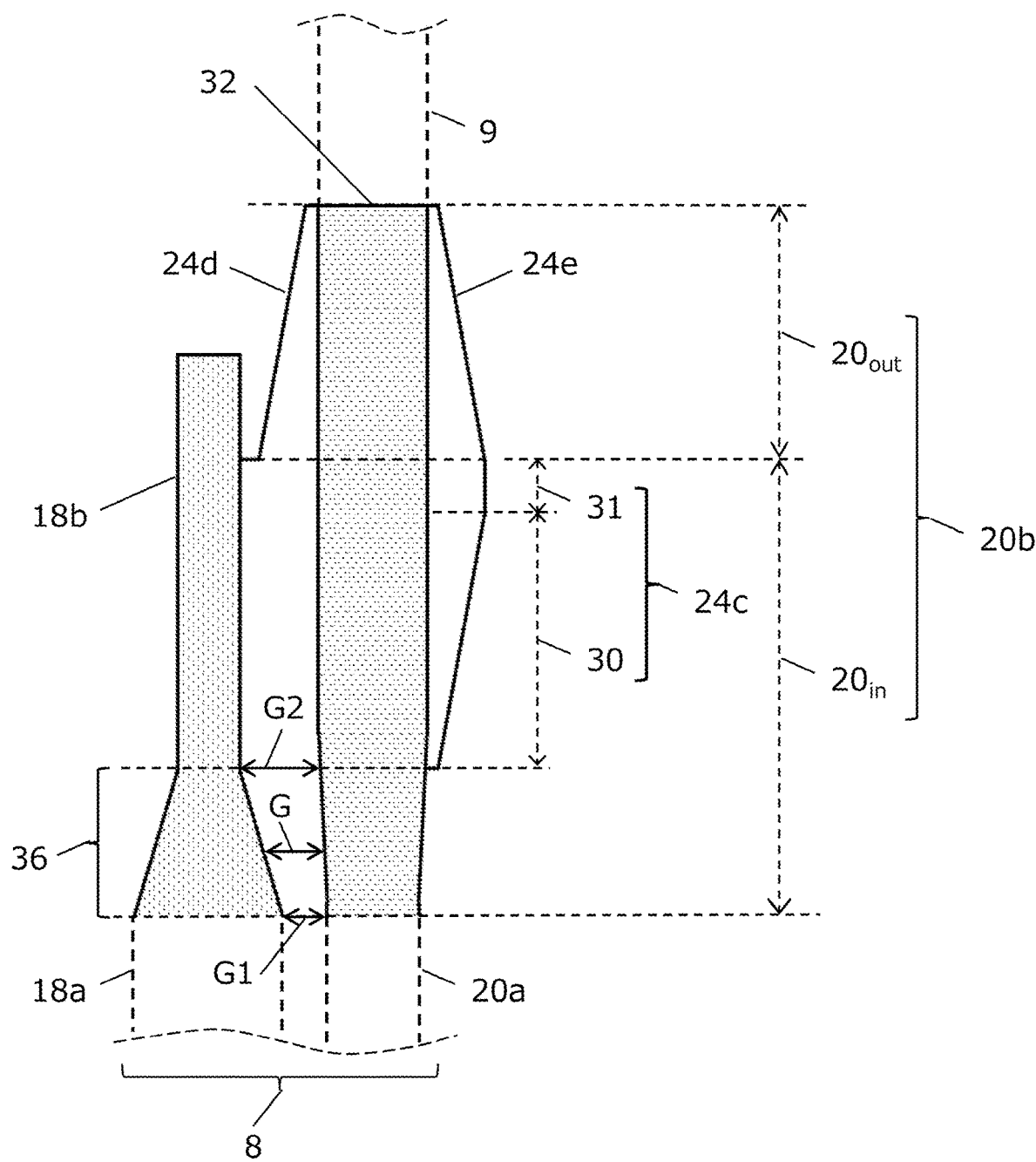
FIG. 6 is a plan view of the rib channel conversion unit 10.

FIG. 6 is a plan view of the rib channel conversion unit 10. As illustrated in FIG. 6, in a coupling region 36 in contact with the mode order conversion unit 8, a gap G between the input-side second rib unit 18b and the output-side second rib unit 20b increases toward one end 32 that is one of both ends of the output-side second rib unit 20b and that is on an opposite side from the output-side first rib unit

20a (in other words, one end 32 on the opposite side to the output-side first rib unit 20a of both ends of the output-side second rib unit 20b). Specifically, of gaps G1 and G2 at both ends of the coupling region 36, the gap G2 closer to the tip (i.e., one end 32) of the output-side second rib unit 20b is wider than the gap G1 closer to the output-side first rib unit 20a. The coupling region 36 is a region of the rib channel conversion unit 10.

The output-side second rib unit 20b (see FIG. 1) includes an inner region $20_{in}$ (see FIG. 6) in contact with the output-side first rib unit 20a and an outer region $20_{out}$ in contact with the inner region $20_{in}$. The rib channel conversion unit 10 further includes: a second slab unit 24b (see FIG. 1) in contact with the first slab unit 24a, a side surface of the inner region $20_{in}$ of the output-side second rib unit 20b, and a side surface of the input-side second rib unit 18b; and a third slab unit 24c in contact with the other side surface of the inner region $20_{in}$.

The rib channel conversion unit 10 further includes a fourth slab unit 24d in contact with the second slab unit 24b and a side surface of the outer region $20_{out}$ of the output-side second rib unit 20b, and a fifth slab unit 24e in contact with the third slab unit 24c and the other side surface of the outer region $20_{out}$. The second slab unit 24b to the fifth slab unit 24e are members thinner than the input-side second rib unit 18b and the output-side second rib unit 20b.

The width of the third slab unit 24c (see FIG. 6) increases toward the tip 32 of the output-side second rib unit 20b. On the other hand, the widths of the fourth slab unit 24d and the fifth slab unit 24e each decrease toward the tip 32 of the output-side second rib unit 20b.

In the example illustrated in FIG. 1 and others, the third slab unit 24c has a tapered region 30 having a width increasing toward the tip 32 of the output-side second rib unit 20b and a rectangular region 31 having a constant width. However, the third slab unit 24c does not have to have the rectangular region 31.

—Polarization Rotation Unit 12 (See FIG. 1)—

The polarization rotation unit 12 (see FIG. 1) has a tapered unit 14 and a coupling unit 16. The tapered unit 14 has an input-side third rib unit 18c whose width widens toward the mode order conversion unit 8, a sixth slab unit 24f in contact with one of the side surfaces of the input-side third rib unit 18c, and a seventh slab unit 24g in contact with the other side surface of the input-side third rib unit 18c.

The input-side third rib unit 18c has a plurality of regions having different angles (i.e., taper angles) formed by the side surfaces. In the example illustrated in FIG. 1, the input-side third rib unit 18c has a region having a great taper angle on the coupling unit 16 side and a region having a low taper angle on the opposite side from the coupling unit 16.

The coupling unit 16 has an input-side fourth rib unit 18d in which one end is in contact with the input-side third rib unit 18c and the other end is in contact with the input-side first rib unit 18a. The width of the input-side fourth rib unit 18d gradually changes from a width W2 at the right end of the input-side third rib unit 18c to a width W3 of the input-side first rib unit 18a. Note that the "right end" means a right-side end (of the input-side third rib unit 18c and the like) in the FIG. 1 and other (the same applies to the "left end" and the like described later).

The coupling unit 16 further has an eighth slab unit 24h in contact with the side surface that is one of the side surfaces of the input-side fourth rib unit 18d and that is on the output-side first rib unit 20a side (in other words, the side surface on the output-side first rib unit 20a side, of the side surfaces of the input-side fourth rib unit 18d). The sixth to eighth slab units 24f to 24h are members thinner than the input-side third and fourth rib units 18c and 18d.

In the example illustrated in FIG. 1, the width W2 at the right end of the input-side third rib unit 18c and the width W3 of the input-side first rib unit 18a are different. However, the width W2 at the right end of the input-side third rib unit 18c and the width W3 of the input-side first rib unit 18a may be the same. In this case, the polarization rotation unit 12 does not have to have the coupling unit 16.

In the example illustrated in FIG. 1, the tapered unit 14 has a plurality of regions having different taper angles. Having the plurality of regions having different taper angles results in increased efficiency of polarization rotation. However, the taper angle of the tapered unit 14 may be constant.

The thicknesses of the input-side first to fourth rib units 18a to 18d and the output-side first to second rib units 20a to 20b are preferably the same. The thicknesses of the first slab unit 24a to the eighth slab unit 24h are also preferably the same.

Since the core 4 is immensely thin as described later, the number of peaks in the electric field distribution of propagating light ($TM_0$ light, $TE_1$ light, $TE_0$ light, etc.) through the core 4 is one in an axis perpendicular to the substrate 11 (e.g., y-axis in FIG. 3 and others).

(2) Operation (2-1) Operation of Polarization Rotation Unit 12

Figure 7:
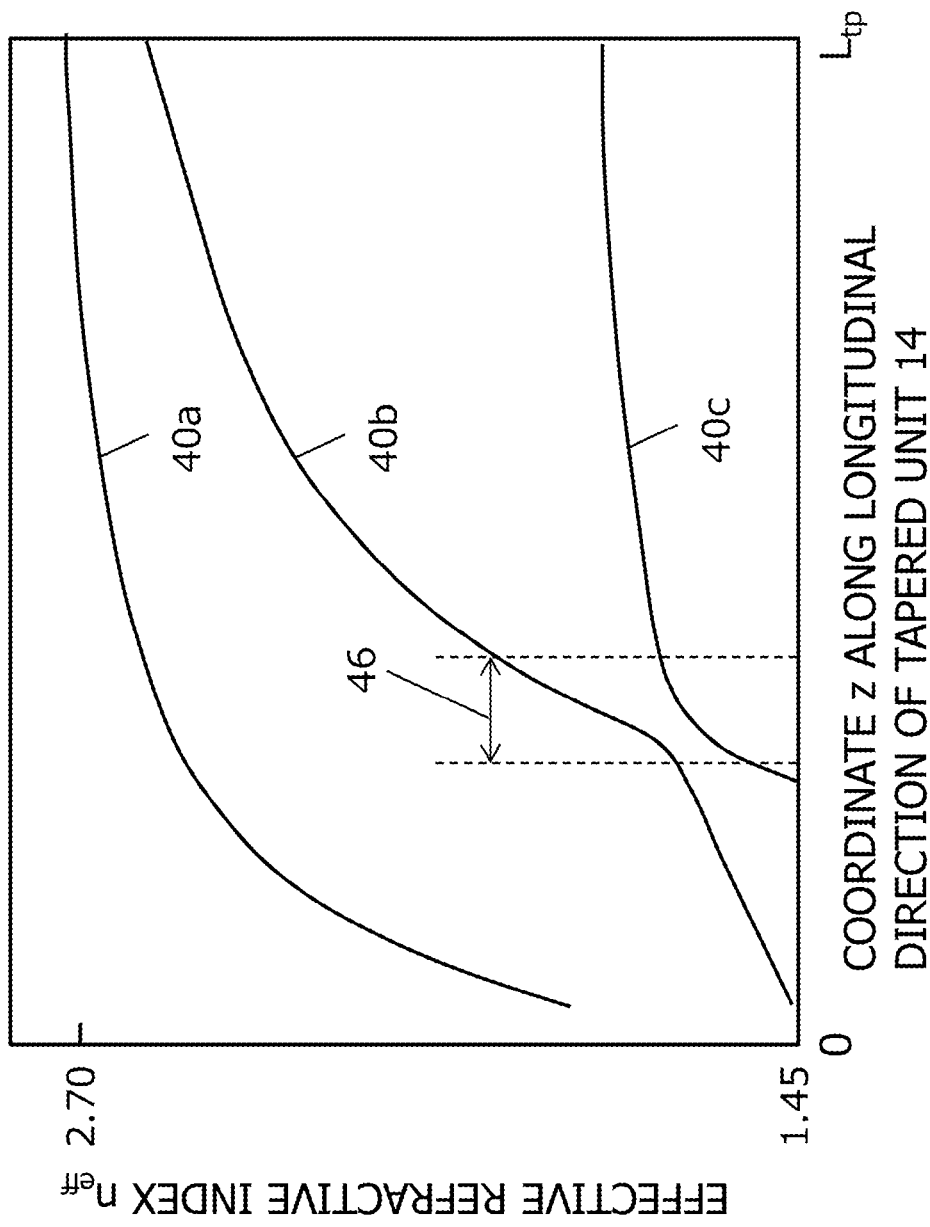
FIG. 7 illustrates an example of the effective refractive index of eigenmodes propagating through the tapered unit 14.

FIG. 7 illustrates an example of the effective refractive index of eigenmodes propagating through the tapered unit 14. The vertical axis represents the effective refractive index. The effective refractive index is calculated by, for instance, the finite element method. The horizontal axis represents the coordinate z along the longitudinal direction of the tapered unit 14.

The coordinate axis for the coordinate z is an axis penetrating the center of the polarization rotation unit 12 (see FIG. 5). However, in FIG. 5, the coordinate axis for the coordinate z is illustrated outside the tapered unit 14 so as not to complicate the drawing. The origin of the coordinate z is a point on an end face 38 on which propagating light (e.g., the $TM_0$ light 3) is incident. $L_{tp}$ (see FIG. 5) is the length of the tapered unit 14.

A first curve 40a in FIG. 7 represents the effective refractive index of an eigenmode having the highest effective refractive index. A second curve 40b represents the effective refractive index of an eigenmode having the second highest effective refractive index. A third curve 40c represents the effective refractive index of an eigenmode having the third highest effective refractive index. In FIG. 7, a case where the taper angle of the input-side third rib unit 18c is constant is represented. The same applies to FIG. 8.

Incidentally, the eigenmode of a two-dimensional optical waveguide (i.e., slab waveguide) that confine light only in the direction perpendicular to the substrate is the TE (Transverse Electric mode) mode or the TM (Transverse Magnetic mode) mode. The TE mode is an eigenmode in which an electric field component Ez in the light propagation direction is zero, and the TE mode of a slab waveguide is an eigenmode in which electromagnetic field components other than Hz, Hy, and Ex are zero. Hz is a magnetic field component in the light propagation direction (e.g., the z-axis direction in FIG. 5). Hy is a magnetic field component in a direction perpendicular to the substrate 11 (e.g., the y-axis direction in FIG. 4). Ex is an electric field component in a direction (e.g., the x-axis direction in FIG. 4) that is perpendicular to the light propagation direction (e.g., the z-axis direction in FIG. 5) and a direction (e.g., the y-axis direction in FIG. 4) perpendicular to the substrate.

The TM mode is propagating light having an Hz of zero, and the TM mode of a slab waveguide is an eigenmode in which electromagnetic field components other than Ez, Ey, and Hx are zero. Ez is an electric field component in the light propagation direction (e.g., the z-axis direction in FIG. 5). Ey is an electric field component in a direction perpendicular to the substrate 11 (e.g., the y-axis direction in FIG. 4). Hx is a magnetic field component in a direction (e.g., the x-axis direction in FIG. 4) that is perpendicular to the light propagation direction (e.g., the z-axis direction in FIG. 5) and a direction (e.g., the y-axis direction in FIG. 4) perpendicular to the substrate.

On the other hand, the eigenmode of the three-dimensional waveguide (e.g., the rectangular waveguide) that confine light in two directions (e.g., the x-axis direction and the y-axis direction in FIG. 4) perpendicular to the light propagation direction is an electromagnetic field in which neither Ez nor Hz are zero.

Main eigenmodes of a three-dimensional optical waveguide are the TE-like mode and the TM-like mode. The TE-like mode is an eigenmode in which Ez and Ey are sufficiently lower than Ex (i.e., Ez, Ey<<Ex). In other words, the TE-like mode is an eigenmode in which the electric field direction is polarized so as to be parallel to the substrate. The TE-like mode can be approximated by the TE mode of a slab waveguide. In the following description, according to the convention, the TE-like mode is referred to as the TE mode.

On the other hand, the TM-like mode is an eigenmode in which Ez and Ex are sufficiently lower than Ey (i.e., Ez, Ex<<Ey). In other words, the TM-like mode is an eigenmode in which the electric field direction is polarized so as to be orthogonal to the substrate. The TM-like mode can be approximated by the TM mode of a slab waveguide. In the following description, according to the convention, the TM-like mode is referred to as the TM mode.

Of the TE modes of a three-dimensional optical waveguide, the TE mode having the highest effective refractive index (i.e., the fundamental mode) is referred to as the $TE_0$ mode, and the TE mode having the second highest effective refractive index is referred to as the $TE_1$ mode. In a same manner, of the TM modes of a three-dimensional optical waveguide, the TM mode having the highest effective refractive index (i.e., the fundamental mode) is referred to as the $TM_0$ mode, and the TM mode having the second highest effective refractive index is referred to as the $TM_1$ mode.

Figure 8:
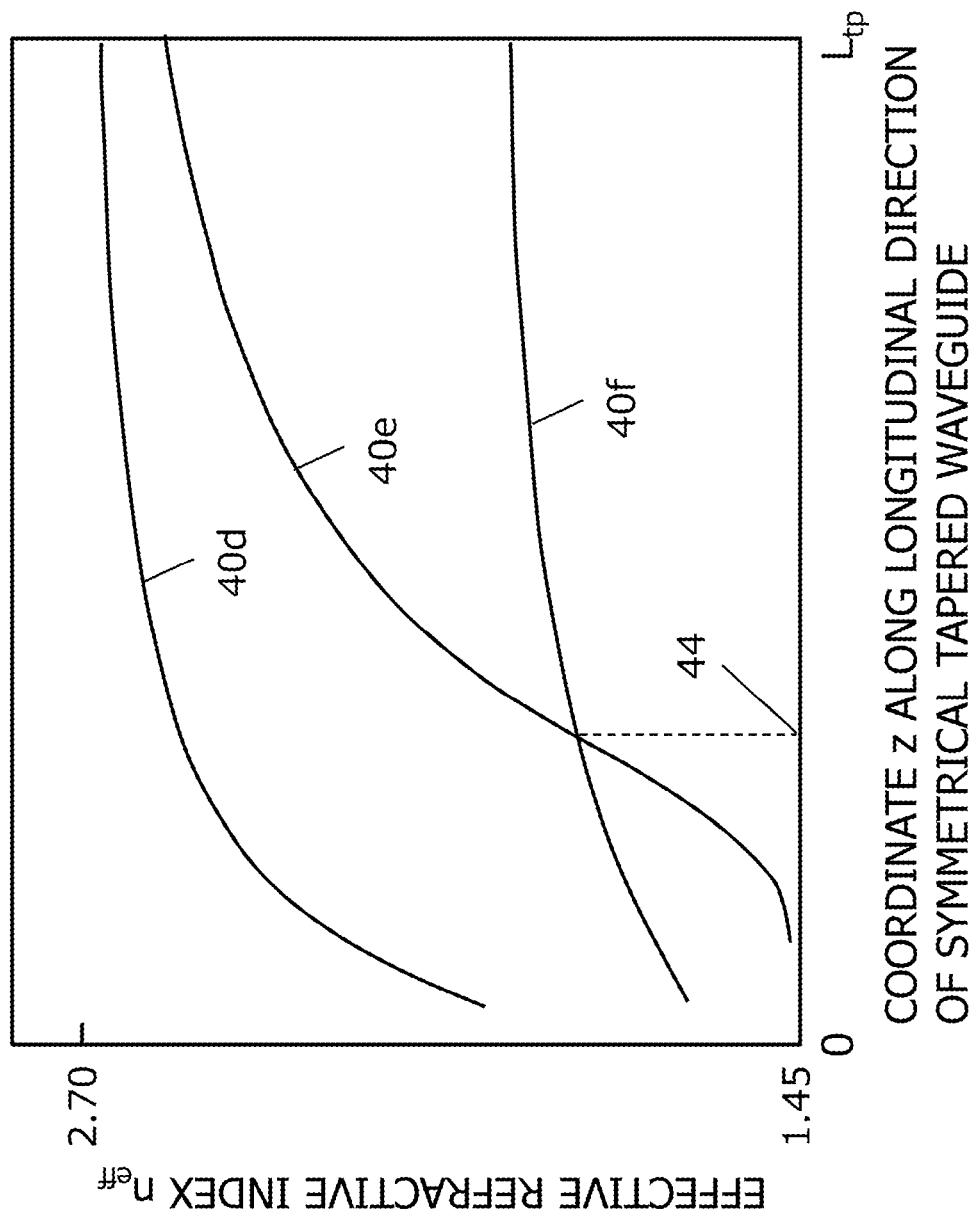
FIG. 8 illustrates an example of the effective refractive index of eigenmodes propagating through an optical waveguide in which the sixth slab unit 24f and the seventh slab unit 24g are removed from the tapered unit 14 of FIG. 1

FIG. 8 illustrates an example of the effective refractive index of eigenmodes propagating through an optical waveguide (hereinafter referred to as a symmetrical tapered waveguide) in which the sixth slab unit 24f and the seventh slab unit 24g are removed from the tapered unit 14 of FIG. 1. The vertical axis represents the effective refractive index. The horizontal axis represents the coordinate z along the longitudinal direction of the symmetrical tapered waveguide. The origin of the coordinate z is a point on the end face 38 (see FIG. 5) on which the propagating light is incident.

Figure 9:
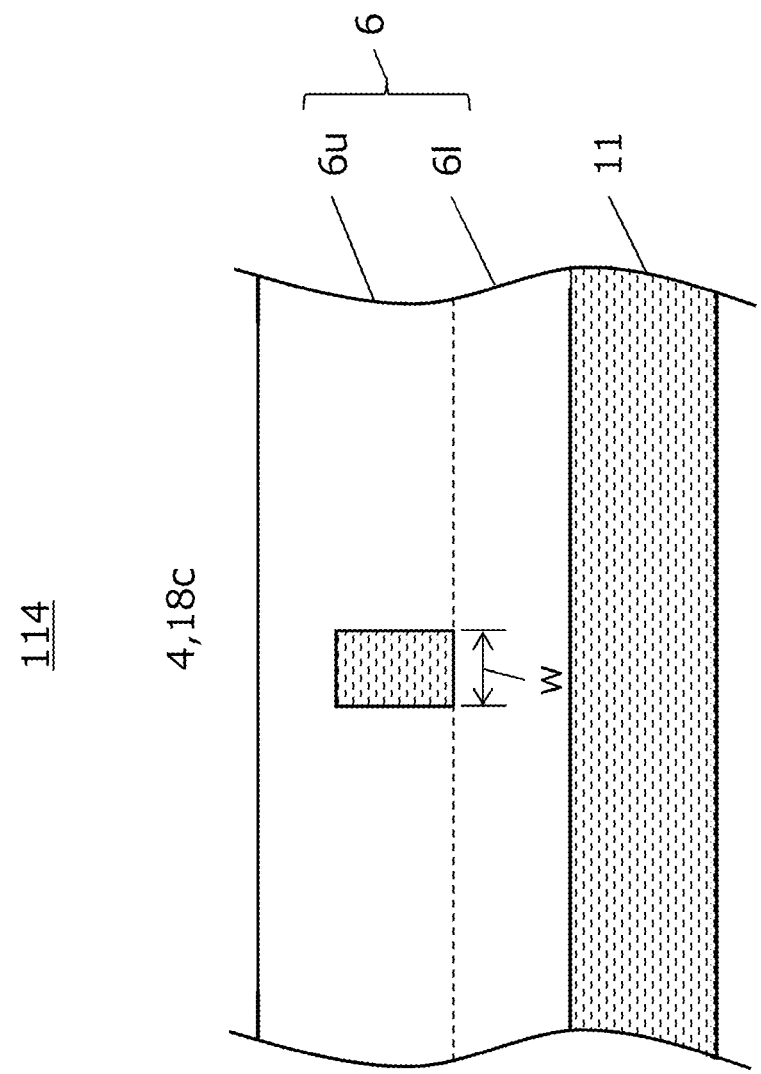
FIG. 9 is a diagram illustrating a cross section of a symmetrical tapered waveguide 114.

FIG. 9 is a diagram illustrating a cross section of a symmetrical tapered waveguide 114. As illustrated in FIG. 9, the symmetrical tapered waveguide 114 is a vertically symmetrical optical waveguide. The eigenmode of such a three-dimensional waveguide is the TE mode or the TM mode.

A fourth curve 40d (see FIG. 8) represents the effective refractive index of the $TE_0$ mode. A fifth curve 40e represents the effective refractive index of the $TE_1$ mode. A sixth curve 40f represents the effective refractive index of the $TM_0$ mode. A rate of change in an effective refractive index $n_{eff}$ with respect to the coordinate z ($=\Delta n_{eff}/\Delta z$) is significantly different between the $TE_1$ mode and the $TM_0$ mode (see FIG. 8). Therefore, the effective refractive index 40e of the $TE_1$ mode and the effective refractive index 40f of the $TM_0$ mode intersect.

The coordinate z corresponds to a core width w of the symmetrical tapered waveguide 114. In a region where the coordinates z are low and the core width w is narrow (e.g., in the vicinity of z=0), the effective refractive index 40e of the $TE_1$ mode is lower than the effective refractive index 40f of the $TM_0$ mode. By contrast, in a region where the coordinates z are great and the core width w is wide (e.g., in the vicinity of $z=L_{tp}$), the effective refractive index 40e of the $TE_1$ mode is greater than the effective refractive index 40f of the $TM_0$ mode. Therefore, as illustrated in FIG. 8, the effective refractive index 40e of the $TE_1$ mode and the effective refractive index 40f of the $TM_0$ mode intersect at a certain point 44.

At this point 44, the $TE_1$ mode and the $TM_0$ mode of the symmetrical tapered waveguide 114 are degenerated without being mixed (i.e., their effective refractive indexes match with each other).

The tapered unit 14 of the first embodiment is vertically asymmetrical because it has the slab units 24g and 24f. The eigenmode of a vertically asymmetrical three-dimensional optical waveguide is the TE mode or the TM mode in a region where the core width is narrow. However, in a region where the core width is wide to some extent and the effective refractive index of an eigenmode is almost the same as the effective refractive index of other eigenmode (e.g., a region 46 in FIG. 7), the eigenmode of the vertically asymmetrical three-dimensional optical waveguide is a hybrid mode in which the TE mode and the TM mode are mixed. In a region where the core width is wider, the eigenmode of the vertically asymmetrical three-dimensional optical waveguide becomes the TE mode or the TM mode again. In that time, the TE mode and the TM mode are switched (see Daoxin Dai, Yongbo Tang, and John E. Bowers, "Mode conversion in tapered submicron silicon ridge optical waveguides," Optics Express, Vol. 20, No. 12, pp. 13425-13439 (2012), for instance).

In the example illustrated in FIG. 7, the eigenmode represented by the curve 40a is the $TE_0$ mode. The eigenmode represented by the curve 40b is the $TM_0$ mode in a region where the coordinates z are lower than those in the region 46 (i.e., a region where the core width is narrow), and is the $TE_1$ mode in a region where the coordinates z are greater than those in the region 46 (i.e., the region where the core width is wide). The eigenmode represented by the curve 40c is the $TE_1$ mode in a region where the coordinates z are lower than those in the region 46, and is the $TM_0$ mode in a region where the coordinates z are greater than those in the region 46. Therefore, for instance, the $TM_0$ light 3 inputted from a channel waveguide 19 via the end face 38 (see FIG. 5) is adiabatically converted into the $TE_1$ light 5 by the tapered unit 14.

The coupling unit 16 modifies the $TE_1$ light 5 so that the beam size matches with that for the input-side first rib unit 18a of the mode order conversion unit 8, and inputs the resulting $TE_1$ light 5 into the input-side first rib unit 18a.

(2-2) Operation of Mode Order Conversion Unit 8

The mode order conversion unit 8 converts the $TE_1$ light 5 (see FIG. 5) inputted to the input-side first rib unit 18a into the $TE_0$ light 7, and inputs the resulting $TE_0$ light 7 into the output-side second rib unit 20b of the rib channel conversion unit 10 from the output-side first rib unit 20a.

Figure 10:
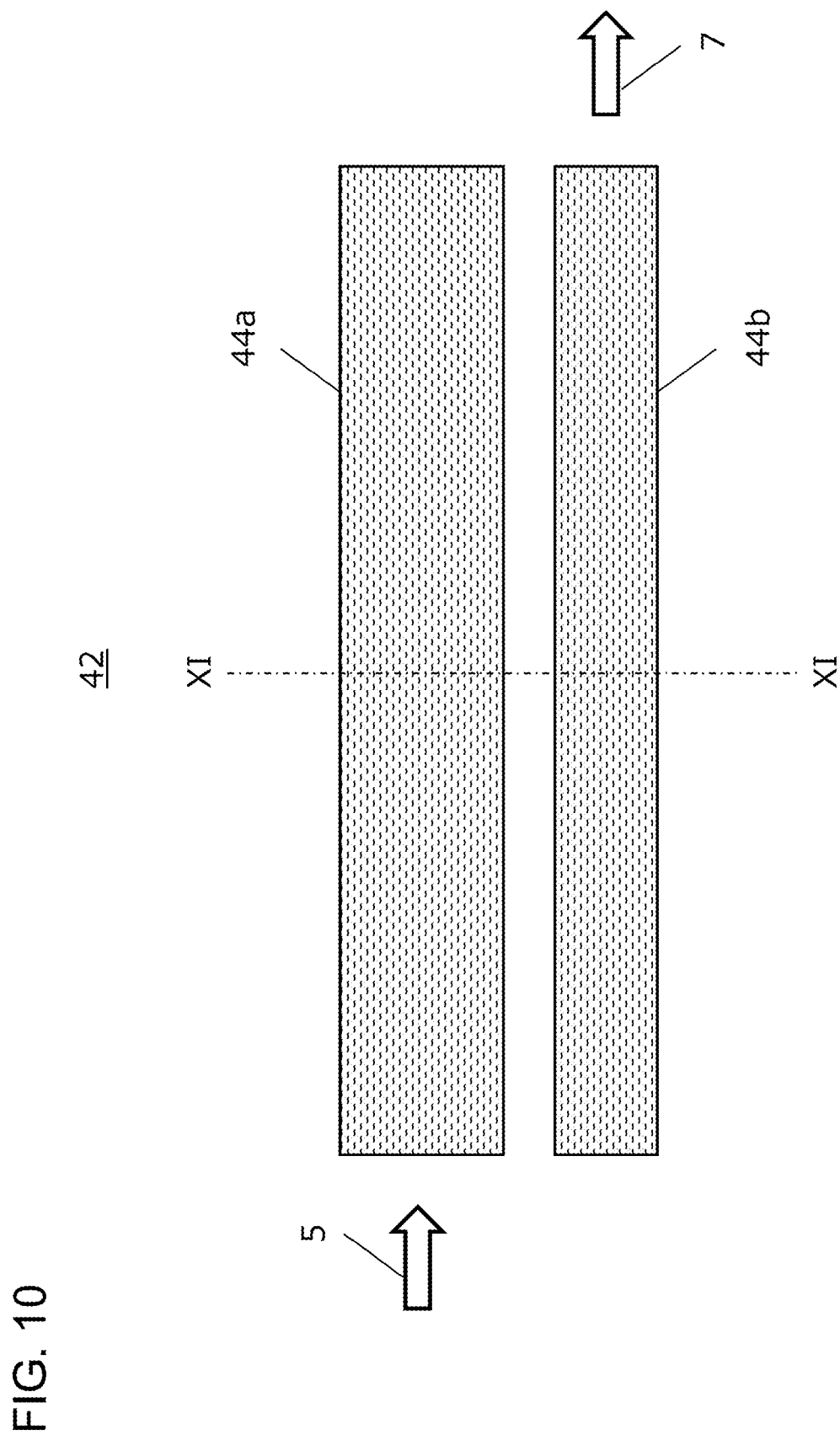
FIG. 10 is a plan view illustrating an example of an asymmetrical directional coupler 42.
Figure 11:
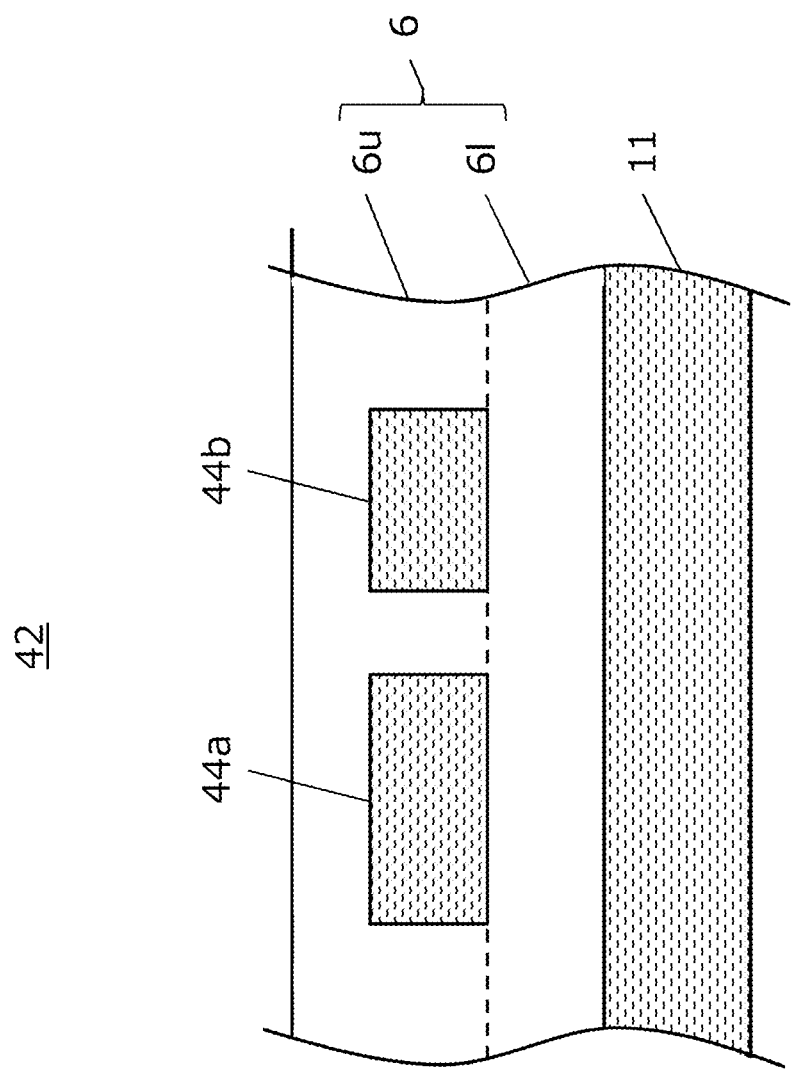
FIG. 11 is a cross-sectional view taken along line XI-XI of FIG. 10.

FIG. 10 is a plan view illustrating an example of an asymmetrical directional coupler 42. FIG. 11 is a cross-sectional view taken along line XI-XI of FIG. 10. The asymmetrical directional coupler 42 includes a first core 44a, a second core 44b narrower than the first core 44a, and a cladding 6 surrounding the first and second cores 44a and 44b. The asymmetrical directional coupler 42 of FIG. 10 is different from the mode order conversion unit 8 in FIG. 1 in that the asymmetrical directional coupler 42 does not have the first slab unit 24a.

Figure 12:
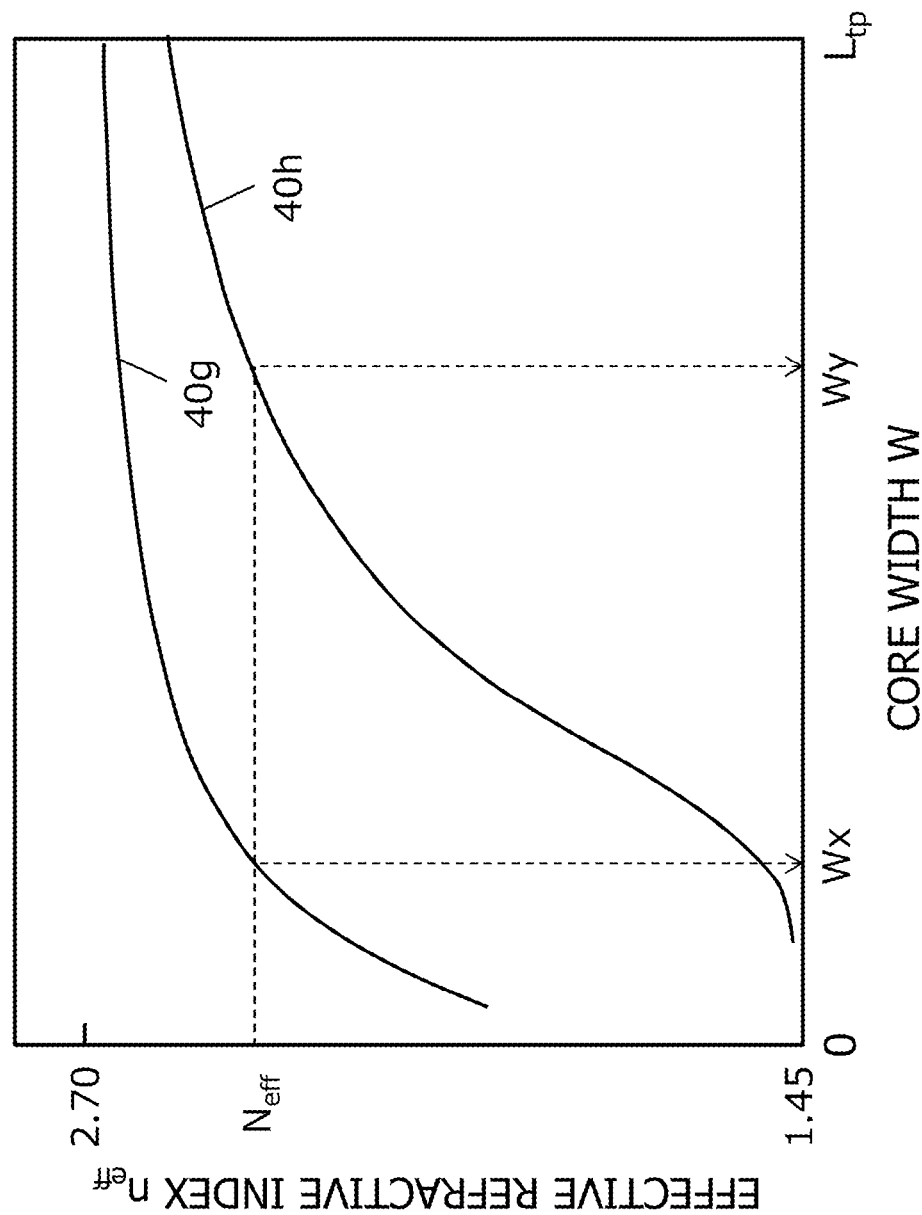
FIG. 12 illustrates an example of the effective refractive index of an eigenmode propagating through a rectangular waveguide.

FIG. 12 illustrates an example of the effective refractive index of an eigenmode propagating through a rectangular waveguide. The vertical axis represents the effective refractive index $n_{\mathit{eff}}$. The horizontal axis represents the core width W of the rectangular waveguide. The rectangular waveguide is an optical waveguide having a core whose cross section is rectangular. A seventh curve 40g represents the effective refractive index of the $TE_0$ mode. An eighth curve 40h represents the effective refractive index of the $TE_1$ mode.

The thickness of the first and second cores 44a and 44b of the asymmetrical directional coupler 42 (see FIG. 11) is the same as the thickness of the rectangular waveguide whose effective refractive index $n_{\mathit{eff}}$ is illustrated in FIG. 12. Further, the refractive indexes of the first and second cores 44a and 44b are the same as the refractive indexes of the cores of the rectangular waveguide whose effective refractive index $n_{\mathit{eff}}$ is illustrated in FIG. 12. The same applies to the refractive index of the cladding 6.

As is clear from FIG. 12, the effective refractive index $N_{\mathit{eff}}$ of the $TE_0$ mode of the rectangular waveguide for a certain core width Wx is the same as the effective refractive index of the $TE_1$ mode of the rectangular waveguide for a core width Wy wider than Wx. Therefore, in a case where the core width of the second core 44b of the asymmetrical directional coupler 42 (see FIG. 10) is Wx and the core width of the first core 44a is Wy, the phase matching between the $TE_0$ mode of the second core 44b and the $TE_1$ mode of the first core 44a is achieved. When the $TE_1$ light 5 is inputted into the first core 44a of such an asymmetrical directional coupler 42, the $TE_0$ light 7 is outputted from the second core 44b.

When the phase matching between the $TE_0$ light 7 and the $TE_1$ light 5 is achieved and the lengths of the first and second cores 44a and 44b are the same as the coupling length, the light intensity (i.e., the light power) of the $TE_0$ light 7 outputted from the second core 44b is ideally the same as the light intensity of the $TE_1$ light 5 inputted into the first core 44a. In other words, the coupling efficiency of the asymmetrical directional coupler (a ratio of the power transferred from one optical waveguide to the other optical waveguide) is ideally the same as that of a directional coupler (i.e., a symmetrical directional coupler) in which the widths of the first to second cores 44a and 44b are equal to each other.

However, in the asymmetrical directional coupler 42, if the wavelength of the $TE_1$ light 5 deviates from the optimum value, the coupling efficiency of the $TE_1$ light 5 and the $TE_0$ light 7 is reduced. As a result, the $TE_0$ light 7 becomes weaker than the $TE_1$ light 5.

It is not easy to match the wavelength of the $TE_1$ light 5 with the optimum value. Further, when the $TE_1$ light 5 is wavelength-multiplexed, it is difficult to match the wavelengths of a plurality of $TE_1$ light beams 5 with the optimum value. Therefore, in most of the mode conversions through the asymmetrical directional coupler 42, an optical loss (hereinafter referred to as a conversion loss) occurs. This problem can be suppressed by providing a slab layer (see the first slab unit 24a in FIG. 1, for instance) between the first core 44a and the second core 44b (see Japanese Laid-open Patent Publication No. 2015-90449, for instance).

Providing a slab layer in between the first core 44a and the second core 44b results in great leak of the $TE_1$ light 5 and the $TE_0$ light 7 into a gap between the first core 44a and the second core 44b. As a result, the overlap between the electric field distribution of the $TE_1$ light 5 and the electric field distribution of the $TE_0$ light 7 increases, and the coupling coefficient of the asymmetrical directional coupler increases. This makes it difficult for the coupling efficiency of the $TE_1$ light 5 and the $TE_0$ light 7 to be affected by a wavelength shift. As a result, the $TE_0$ light 7 becomes stronger (see Japanese Laid-open Patent Publication No. 2015-90449, for instance).

Since the first slab unit 24a is arranged between the input-side first rib unit 18a and the output-side first rib unit 20a of the mode order conversion unit 8 in the first embodiment, it is possible to convert the $TE_1$ light 5 into the $TE_0$ light 7 while suppressing the conversion loss, according to the first embodiment.

(2-3) Operation of Rib Channel Conversion Unit 10

Figure 13:
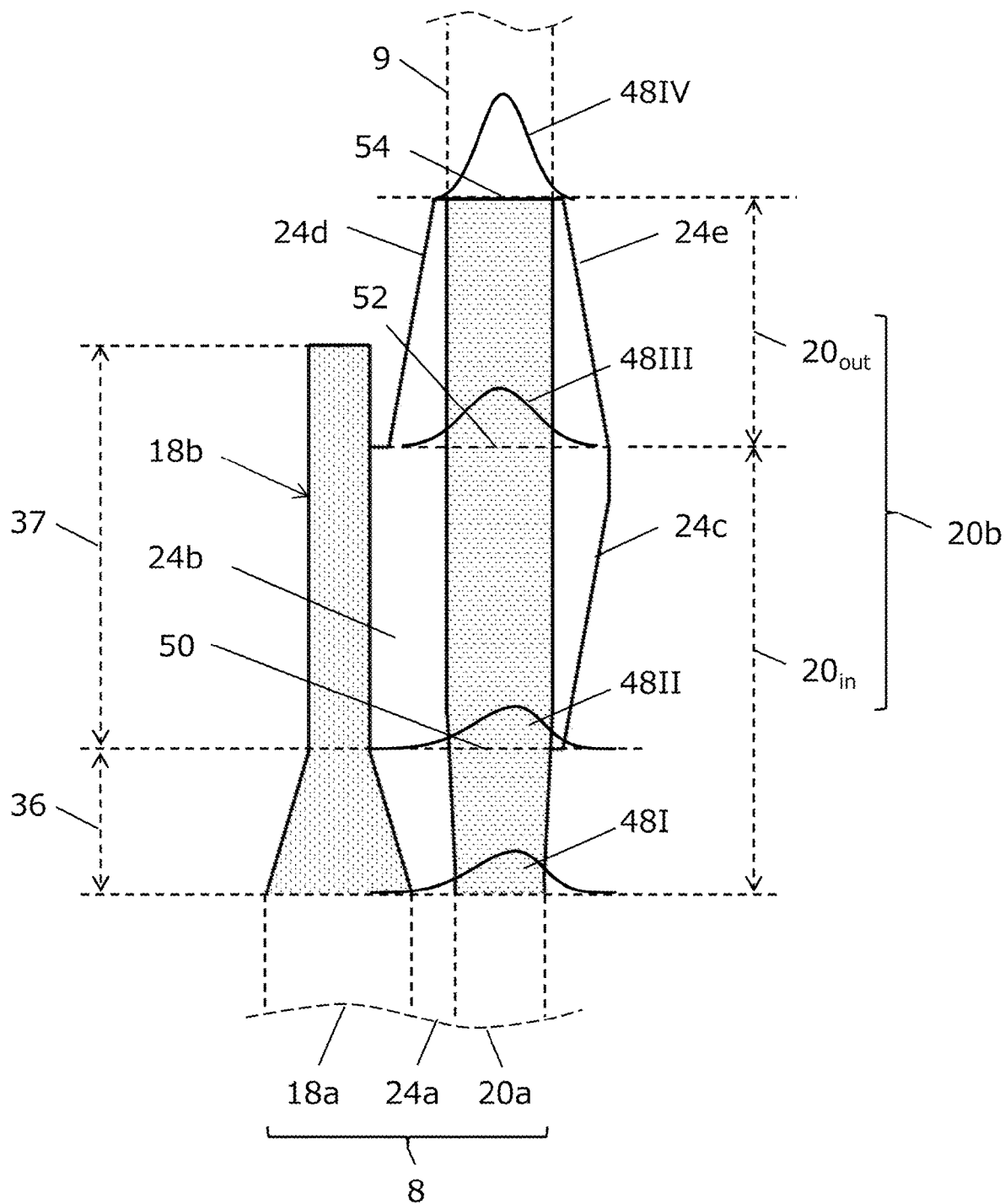
FIG. 13 is a diagram illustrating a transition of the electric field distribution of the $TE_0$ light 7 in the rib channel conversion unit 10.

FIG. 13 is a diagram illustrating a transition of the electric field distribution of the $TE_0$ light 7 in the rib channel conversion unit 10 (see FIG. 5). In FIG. 13, illustrated are electric field distributions 48I to 48IV of the $TE_0$ light along the x-axis direction (see FIG. 3).

In the mode order conversion unit 8, only one of both side surfaces of the output-side first rib unit 20a is coupled to a slab layer (i.e., the first slab unit 24a). Accordingly, the electric field distribution 48I (see FIG. 13) of the $TE_0$ light 7 inputted from the mode order conversion unit 8 is laterally asymmetrical. The rib channel conversion unit 10 modifies this laterally asymmetrical electric field distribution to a symmetrical electric field distribution and outputs the symmetrical electric field distribution from the output-side second rib unit 20b.

The $TE_0$ light 7 first propagates through the output-side second rib unit 20b in the coupling region 36 that is a region in contact with the mode order conversion unit 8. In this coupling region 36, the gap G (see FIG. 6) between the input-side second rib unit 18b and the output-side second rib unit 20b gradually increases as the distance from the mode order conversion unit 8 increases. Accordingly, the coupling coefficient between the input-side second rib unit 18b and the output-side second rib unit 20b gradually decreases, and becomes negligible at an end 50 of the coupling region 36. Therefore, the $TE_0$ light 7 propagating through the output-side second rib unit 20b does not return to the propagating light in the input-side second rib unit 18b.

In the coupling region 36, only one of both side surfaces of the output-side second rib unit 20b is coupled to a slab layer (i.e., the second slab unit 24b). Therefore, the electric field distribution 48II of the $TE_0$ light 7 at the end 50 of the coupling region 36 remains asymmetrical.

In a region following the coupling region 36 (a portion of the inner region $20_{in}$ that is not included in the coupling region 36), the slab layers (i.e., the second slab unit 24b and the third slab unit 24c) are coupled to both side surfaces of the output-side second rib unit 20b. Accordingly, the electric field distribution of the $TE_0$ light 7 is modified to the symmetrical electric field distribution 48III.

The electric field distribution 48III of the $TE_0$ light 7 at an end 52 of the inner region $20_{in}$ of the output-side second rib unit 20b is symmetrical, but significantly extends to the slab layers (i.e., the second and third slab units 24b and 24c). Therefore, the electric field distribution 48III is significantly different from the electric field distribution 48IV in the channel waveguide 9 (i.e., the rectangular waveguide).

The slab layers whose width gradually narrows (i.e., the fourth and fifth slab units 24d and 24e) are coupled to both side surfaces of the outer region $20_{out}$ of the output-side second rib unit 20b. Therefore, in the outer region $20_{out}$, the electric field distribution of the $TE_0$ light 7 gradually narrows toward the channel waveguide 9 to concentrate on the output-side second rib unit 20b. Finally, the electric field distribution 48IV at an end 54 of the outer region $20_{out}$ almost coincides with the electric field distribution of the $TE_0$ mode in the channel waveguide 9. Therefore, the $TE_0$ light 7 is hardly reflected at the boundary (i.e., the end 54) between the mode converter 2 and the channel waveguide, and intactly enters the channel waveguide 9.

If the channel waveguide 9 is directly coupled to the output-side first rib unit 20a without the rib channel conversion unit 10 being interposed therebetween, the $TE_0$ light 7 is reflected due to the mismatch of the electric field distributions (see the electric field distribution 48I and the electric field distribution 48IV), resulting in a reflection loss. However, since the mode converter 2 according to the first embodiment includes the rib channel conversion unit 10, the $TE_0$ light 7 is hardly reflected. Accordingly, according to the first embodiment, the reflection loss when the $TE_0$ light 7 is outputted from the mode converter 2 is suppressed. Note that in the example illustrated in FIG. 13 and others, the third slab unit 24c is arranged outside the coupling region 36, but the tip of the third slab unit 24c may extend to the inside of the coupling region 36.

Incidentally, propagating light (hereinafter referred to as non-converted part) that is a part of the $TE_1$ light 5 inputted into the mode order conversion unit 8 and that is not converted to the $TE_0$ light 7 is inputted into the input-side second rib unit 18b. As illustrated in FIG. 1, a tip part 37 of the input-side second rib unit 18b is narrowed in order to increase the beam diameter of the non-converted part. When the beam diameter of the non-converted part at the tip part 37 is increased, the difference between the effective refractive index of the tip part 37 and the refractive index of the cladding 6 is reduced. Then, the reflectance of the non-converted part at the tip part 37 is reduced, and the non-converted part is hardly reflected and is intactly outputted to the cladding 6.

(3) Rib Channel Conversion Unit Using One-Sided Rib

The output-side second rib unit 20b (see FIG. 13) and the second and third slab units 24b and 24c form a both-side rib in which the slab layers are coupled to both side surfaces of the rib unit thicker than the slab layers. Due to the both-side rib, the center of the electric field distribution 48II shifted toward the input-side second rib unit 18b moves to the output-side second rib unit 20b side, and the laterally symmetrical electric field distribution 48III is formed.

Figure 14:
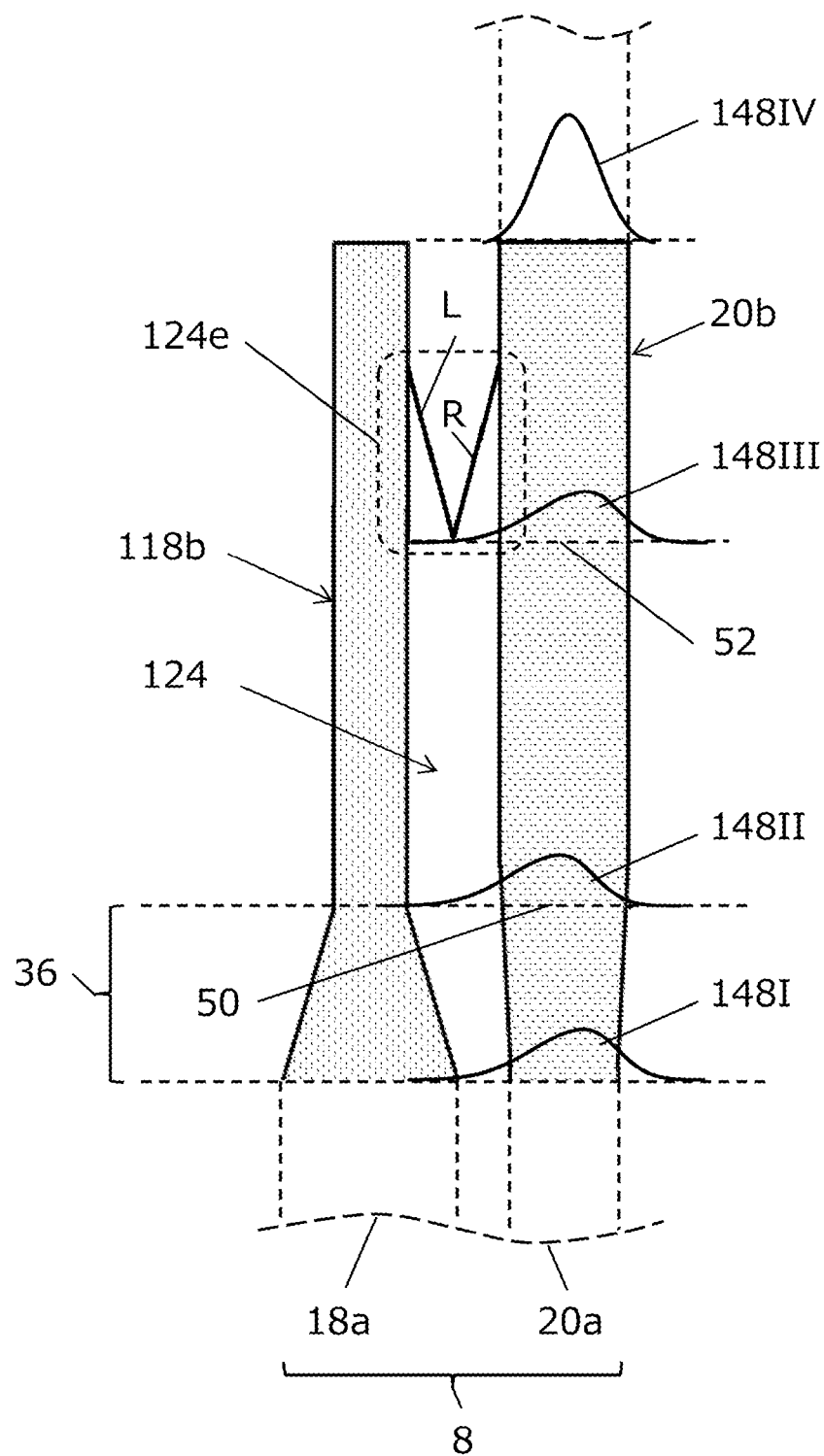
FIG. 14 is a plan view illustrating an example of a rib channel conversion unit 110 using a one-sided rib.

However, the laterally symmetrical electric field distribution can also be formed with a one-sided rib. FIG. 14 is a plan view illustrating an example of a rib channel conversion unit 110 using a one-sided rib.

The rib channel conversion unit 110 in FIG. 14 includes an input-side second rib unit 118b, the output-side second rib unit 20b, and a slab layer 124 having a V-shaped tip part 124e (hereinafter referred to as a slab tip part).

As illustrated in FIG. 14, the output-side second rib unit 20b and the slab layer 124 form a one-sided rib in which only one side surface of a rib unit is coupled to a slab layer. Electric field distributions 148I, 148II, and 148III of the $TE_0$ light 7 before reaching the slab tip part 124e are laterally asymmetrical because the $TE_0$ light 7 propagates through the one-sided rib.

As illustrated in FIG. 14, the width of a right side portion R of the slab tip part 124e gradually narrows toward the tip of the output-side second rib unit 20b. Accordingly, the leak of the $TE_0$ light 7 into the slab layer 124 is gradually reduced, and finally, the electric field distribution of the $TE_0$ light 7 becomes symmetrical in the lateral direction (see an electric field distribution 148IV). However, the rib channel conversion unit 110 using the one-sided rib has a problem that a scattering loss of the $TE_0$ light 7 is great.

Figure 15:
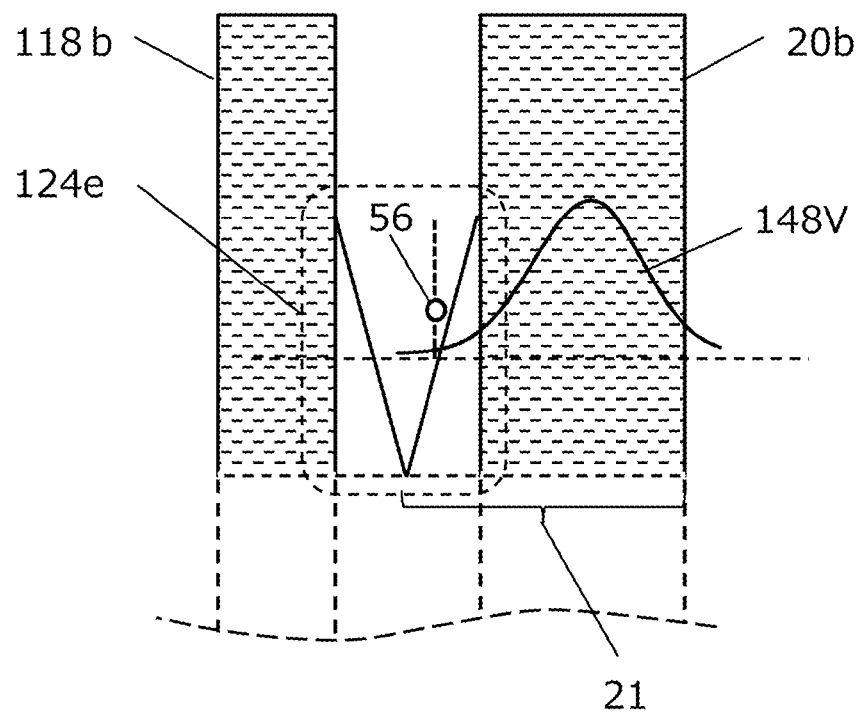
FIG. 15 is a diagram illustrating an electric field distribution 148V of the $TE_0$ light 7 passing through a one-sided rib 21 formed by the right-side portion R of the slab tip portion 124e and the output-side second rib unit 20b.

FIG. 15 is a diagram illustrating an electric field distribution 148V of the $TE_0$ light 7 passing through a one-sided rib 21 formed by the right side portion R of the slab tip portion 124e and the output-side second rib unit 20b. As illustrated in FIG. 15, the electric field distribution 148V of the $TE_0$ light 7 passing through the one-sided rib 21 extends to the slab tip portion 124e. Therefore, an electric field strength 56 at a side surface of the slab tip portion 124e (particularly, the side surface of the right side portion R) is not sufficiently attenuated.

As a result, the $TE_0$ light 7 is scattered by a rough side wall of the slab tip portion 124e, and the great scattering loss occurs in the $TE_0$ light 7. The "rough side wall" is non-uniform or uneven surface generated on a side surface of a Si layer or the like due to dry etching.

Figure 16:
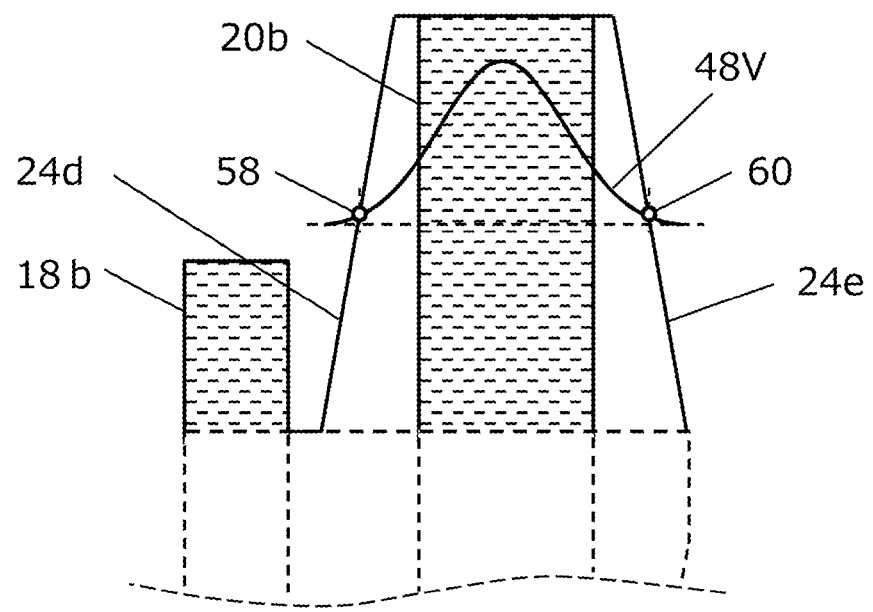
FIG. 16 is a diagram illustrating an electric field distribution 48V of the $TE_0$ light 7 propagating through the tip end portion of the output-side second rib unit 20b of the rib channel conversion unit 10.

On the other hand, such a problem does not occur in the rib channel conversion unit 10 in the first embodiment described with reference to FIG. 1 and others. FIG. 16 is a diagram illustrating an electric field distribution 48V of the $TE_0$ light 7 propagating through the tip end portion (i.e., the outer region $20_{out}$) of the output-side second rib unit 20b of the rib channel conversion unit 10.

As illustrated in FIG. 16, the electric field distribution 48V is laterally symmetrical, and electric field strengths 58 and 60 at the side surfaces of the fourth and fifth slab units 24d and 24e are sufficiently attenuated. Accordingly, the scattering of the $TE_0$ light due to the rough side walls of the fourth and fifth slab units 24d and 24e is limited, and almost no scattering loss occurs in the $TE_0$ light 7 propagating through the output-side second rib unit 20b.

Note that the $TE_0$ light 7 in the inner region $20_{in}$ leaks into the second slab unit 24b in a great amount and does not leak into the third slab unit 24c so much (see the electric field distribution 48II in FIG. 13). Therefore, the scattering loss of the $TE_0$ light 7 due to the rough side wall of the third slab unit 24c is limited.

(4) Manufacturing Method and Dimensions

The mode converter 2 is formed of, for instance, an SOI (Silicon on Insulator) wafer. First, a photoresist film having almost the same shape and size as the core 4 in plain view is formed on the surface of a Si layer on a buried oxide film by photolithography technique. Next, the Si layer in a region not covered with a photoresist film is removed by dry etching, and then the photoresist film is removed.

On the Si layer exposed by removing the photoresist film, a photoresist film having almost the same shape and size as the input-side first to fourth rib units 18a to 18d and the output-side first and second rib units 20a and 20b in plain view is formed again by the photolithography technique.

Next, the upper layer portion of the Si layer in the region not covered with the photoresist film again formed is removed by dry etching. By this dry etching, the first to eighth slab units 24a to 24h are formed. Further, on the region covered with the photoresist film, the input-side first to fourth rib units 18a to 18d and the output-side first and second rib units 20a and 20b are formed. The core 4 is formed by the processes up to this point.

Then, a $SiO_2$ film is deposited on the buried oxide film and the core 4 to form the upper cladding 6u. The buried oxide film (e.g., $SiO_2$ film) is used as the lower cladding layer 6l.

The thickness of each of the input-side first to fourth rib units 18a to 18d and the output-side first and second rib units 20a and 20b is preferably 0.1 to 0.5 μm (e.g., 0.22 μm). The thickness of each of the first to eighth slab units 24a to 24h is preferably 0.05 μm to 0.2 μm (e.g., 0.1 μm).

Figure 17:
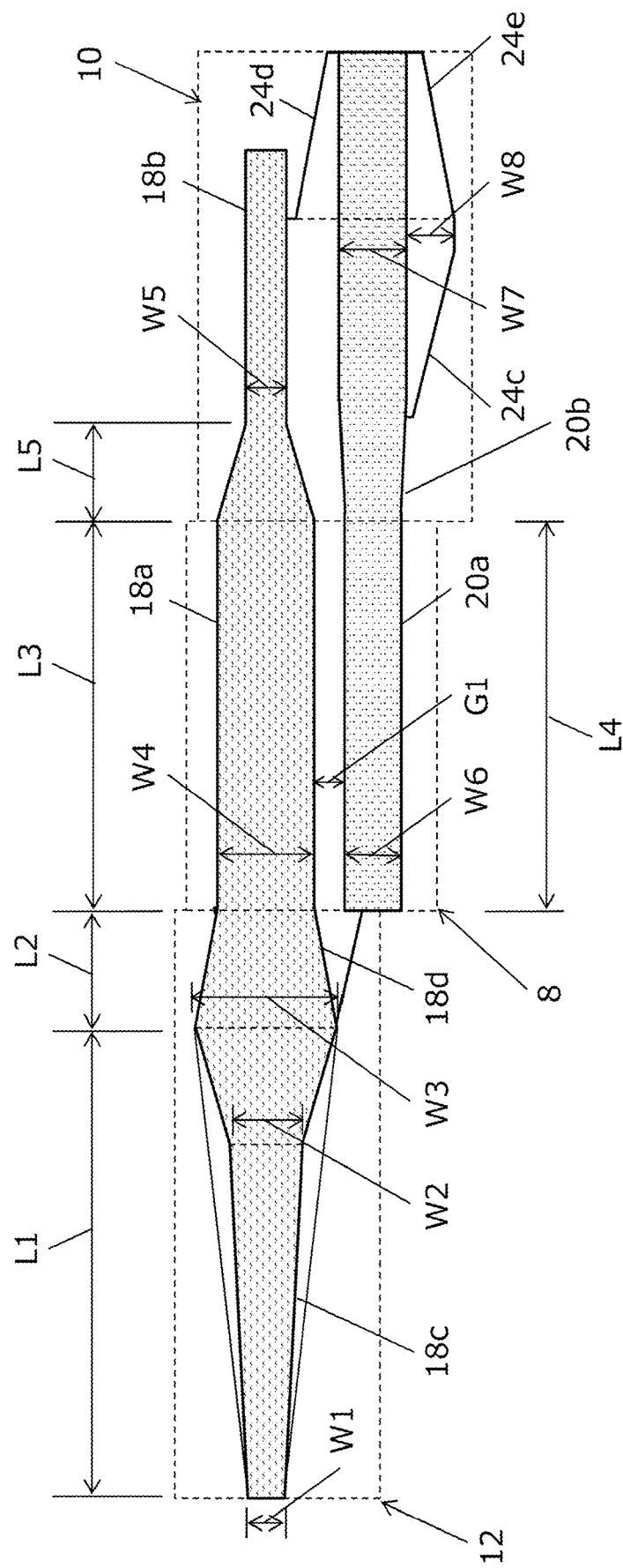
FIG. 17 is a diagram for illustrating an example of the size of the mode converter 2 in the horizontal direction.

FIG. 17 is a diagram for illustrating an example of the size of the mode converter 2 in the horizontal direction. A width W1 of the left end of the input-side third rib unit 18c is preferably 0.2 μm to 0.8 μm (e.g., 0.4 μm). A length L1 of the input-side third rib unit 18c is preferably 30 μm to 120 μm (e.g., 60 μm).

The input-side third rib unit 18c spreads to a width W2 at a constant taper angle. The width W2 is preferably a width of 0.3 μm to 1.3 μm (e.g., 0.65 μm). The input-side third rib unit 18c has a taper angle greater than the above taper angle, and spreads to a width W3 of the left end of the input-side fourth rib unit 18d. The width W3 is preferably a width of 0.8 μm to 3.2 μm (e.g., 1.6 μm).

The width of the input-side fourth rib unit 18d changes to a width W4 of the input-side first rib unit 18a at a constant taper angle. The width W4 is preferably 0.5 μm to 2.3 μm (e.g., 1.11 μm). A length L2 of the input-side fourth rib unit 18d is preferably 2 μm to 8 μm (e.g., 4 μm). A length L3 of the input-side first rib unit 18a is preferably 4 μm to 16 μm (e.g., 8 μm).

The width of the input-side second rib unit 18b decreases from the width W4 of the input-side first rib unit 18a to a width W5 at a constant taper angle. The width W5 is preferably 0.1 μm to 0.6 μm (e.g., 0.3 μm). The width of the input-side second rib unit 18b reduced to the width W5 is kept constant until the right end of the input-side second rib unit 18b.

A width W6 of the output-side first rib unit 20a is preferably 0.2 μm to 1.0 μm (e.g., 0.46 μm). A length L4 of the output-side first rib unit 20a is preferably 4 μm to 16 μm (e.g., 8 μm).

The width of the output-side second rib unit 20b preferably slightly increases from the width W6 of the output-side first rib unit 20a to a constant width W7 at a constant taper angle. The width W7 is preferably 0.2 μm to 1.0 μm (e.g., 0.48 μm). The width of the output-side second rib unit 20b increased to the width W7 is kept constant until the right end of the output-side second rib unit 20b. The width W7 is preferably the width of the channel waveguide 9 (see FIG. 5). A length L5 of the coupling region 36 (see FIG. 6) is preferably 2 μm to 8 μm (e.g., 4 μm).

The gap G1 between the input-side first rib unit 18a and the output-side first rib unit 20a is constant, preferably 0.08 μm to 0.32 μm (e.g., 0.16 μm).

The width of the left end of the third slab unit 24c is preferably 0 μm to 0.1 μm (e.g., 0.05 μm). A width W8 of the right end of the third slab unit 24c is preferably 0.15 μm to 0.6 μm (e.g., 0.3 μm).

The width of the left end of the fifth slab unit 24e is preferably 0.15 μm to 0.6 μm (e.g., 0.3 μm). The width of the right end of the fifth slab unit 24e is preferably 0 μm to 0.1 μm (e.g., 0.05 μm). The width of the fourth slab unit 24d is preferably the same as the width of the fifth slab unit 24e.

(5) Application Examples

Figure 18:
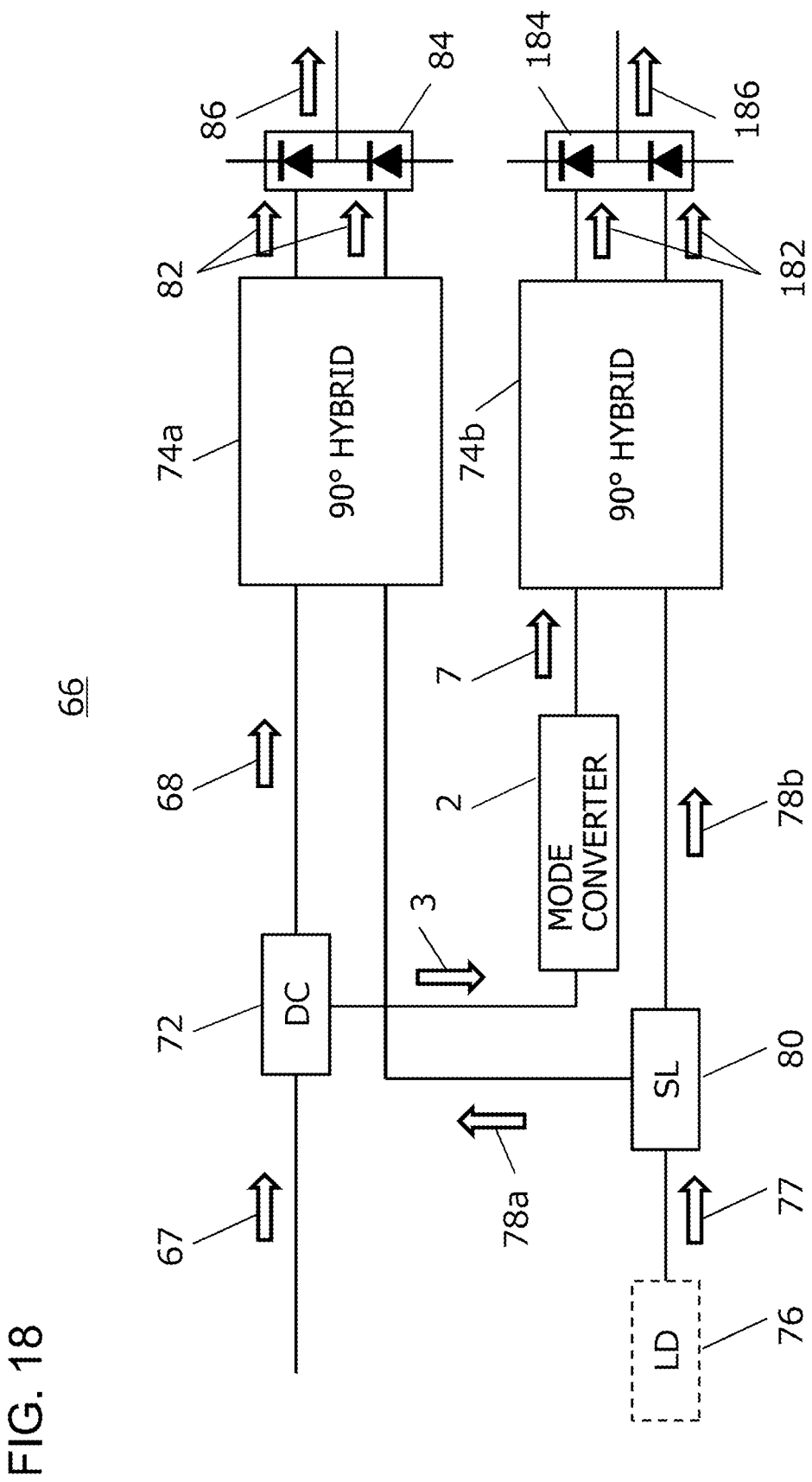
FIG. 18 is a block diagram illustrating an example of a digital coherent receiver 66 to which the mode converter 2 is applied.

FIG. 18 is a block diagram illustrating an example of a digital coherent receiver 66 to which the mode converter 2 is applied. The digital coherent receiver 66 can be used, for instance, for inter-element communication (i.e., interconnection) of a silicon photonics device in which optical elements are integrated on an SOI substrate.

The digital coherent receiver 66 demultiplexes signal light 67 into $TM_0$ light 3 and $TE_0$ light 68 by a directional coupler 72, the signal light 67 being subjected to polarization multiplexing and phase modulation. The digital coherent receiver 66 further splits a laser beam 77 outputted from a semiconductor laser 76 into first local light 78a and second local light 78b by an optical splitter 80.

The $TE_0$ light 68 demultiplexed by the directional coupler 72 and the first local light 78a are combined by a first 90° optical hybrid 74a and thus converted into sets of interference light 82 in which light beams in each set are different in phase by 180° from each other. The sets of interference light 82 are photoelectrically converted into electric signals 86 by a balance detector 84. The modulation signal used for modulating the $TE_0$ light 68 is demodulated from the electric signals 86 by an integrated circuit (not illustrated).

Note that two sets of interference light 82 in which light beams in each set are different in phase by 180° from each other are outputted from the first 90° optical hybrid 74a, but only one set is illustrated in FIG. 18 for simplification of the drawing. The same applies to sets of interference light outputted from a second 90° optical hybrid 74b.

The $TM_0$ light 3 demultiplexed by the directional coupler 72 is converted into $TE_0$ light 7 by the mode converter 2. The $TE_0$ light 7 and the second local light 78b are combined by the second 90° optical hybrid 74b and thus converted into sets of interference light 182 in which light beams in each set are different in phase by 180° from each other. The sets of interference light 182 are photoelectrically converted into electric signals 186 by a balance detector 184. The modulation signal used for modulating the $TM_0$ light 3 is demodulated from the electric signals 186 by an integrated circuit (not illustrated). By the above processing, the digital coherent receiver 66 demodulates the signal light 67 subjected to polarization multiplexing and phase modulation.

Since the mode converter 2 can be integrated on the SOI substrate together with the directional coupler 72 and the like, the digital coherent receiver 66 for inter-element communication between the silicon photonics devices can be implemented using the mode converter 2 according to the first embodiment.

(6) Modifications (6-1) First Modification

Figure 19:
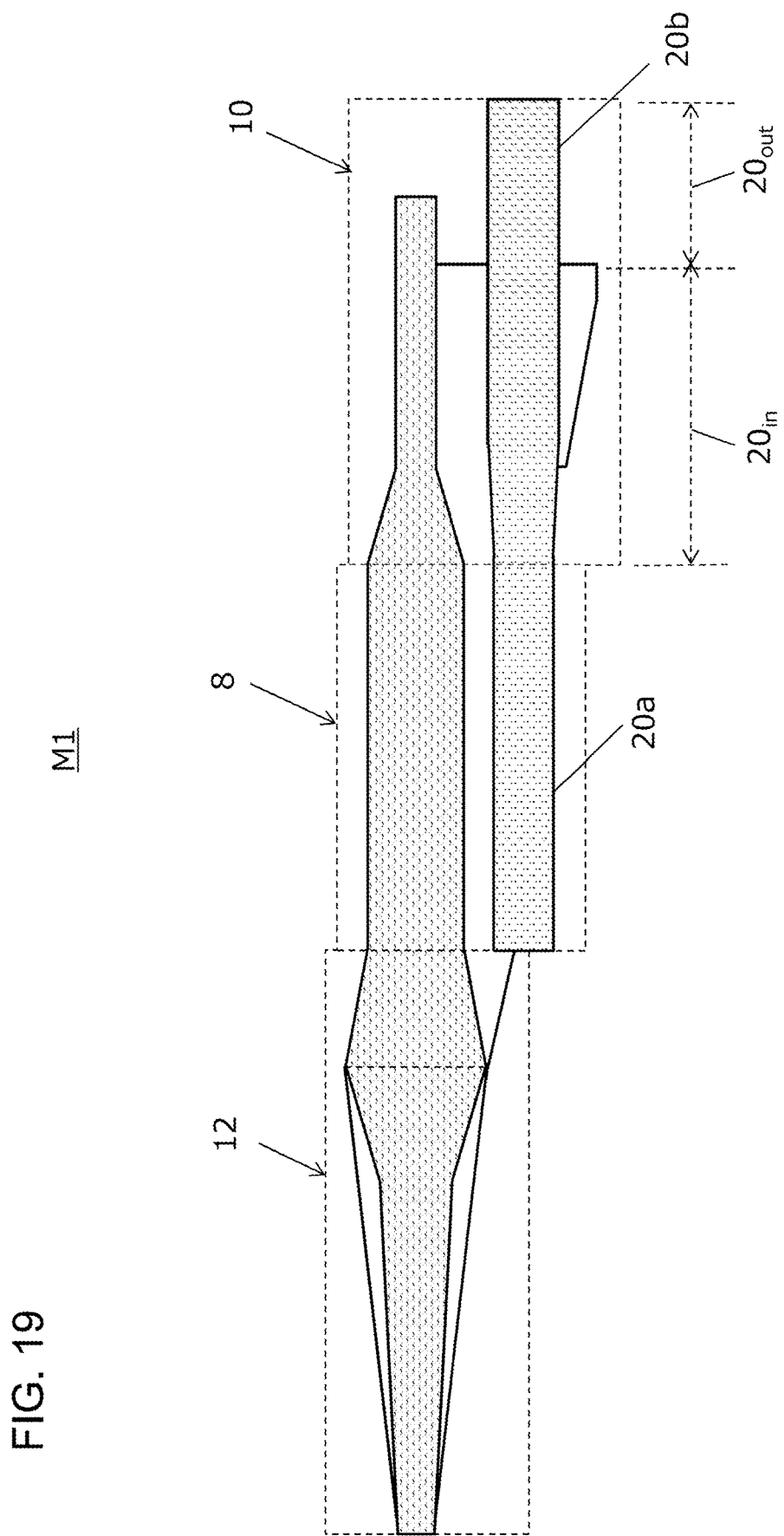
FIG. 19 is a plan view illustrating an example of a mode converter M1 according to a first modification.

FIG. 19 is a plan view illustrating an example of a mode converter M1 according to a first modification. The structure of the mode converter M1 is almost the same as that of the mode converter 2 described with reference to FIG. 1 except that it does not include the fourth and fifth slab units 24d and 24e.

Since the mode converter M1 does not include the fourth and fifth slab units 24d and 24e, the $TE_0$ light 7 propagating through the output-side second rib unit 20b is reflected when emitted from the inner region $20_{in}$ of the output-side second rib unit 20b. However, by optimizing the converter structure (e.g., the width and thickness of each region of the core 4), the reflection of the $TE_0$ light 7 to be emitted from the inner region $20_{in}$ can be suppressed. For instance, according to the dimensions described in parentheses in "(4) Manufacturing method and dimensions" (e.g., a thickness of 0.22 µm of the output-side first and second rib units 20a to 20b, etc.), it is possible to suppress the reflection loss to −30 dB.

Incidentally, when the structures (i.e., width, thickness, etc.) of the outer region $20_{out}$ of the output-side second rib unit 20b and the channel waveguide 9 (see FIG. 5) match each other, the outer region $20_{out}$ itself does not have to be provided. In this case, the waveguide structures in which the mode converter of the modification M1 and the channel waveguide 9 are coupled to each other are almost the same regardless of whether or not the outer region $20_{out}$ is provided to the mode converter M1. Therefore, the channel waveguide 9 may be directly coupled to the inner region $20_{in}$ of the output-side second rib unit 20b without providing the outer region $20_{out}$ to the the mode converter M1.

According to the first modification, the converter structure can be simplified, so that the manufacturing process can be simplified.

(6-2) Second Modification

The width of the third slab unit 24c described with reference to FIG. 1 gradually increases toward the tip 32 of the output-side second rib unit 20b. However, the width of the third slab unit 24c does not have to gradually increase. For instance, the width of the third slab unit 24c may increase stepwise. Alternatively, the third slab unit 24c may be a rectangular slab layer having a constant width. Even with such a structure, it is possible to make the electric field distribution of the $TE_0$ light 7 propagating through the output-side second rib unit 20b laterally symmetrical.

According to the second modification, the converter structure can be simplified, so that the manufacturing process can be simplified.

(6-3) Third Modification

Figure 20:
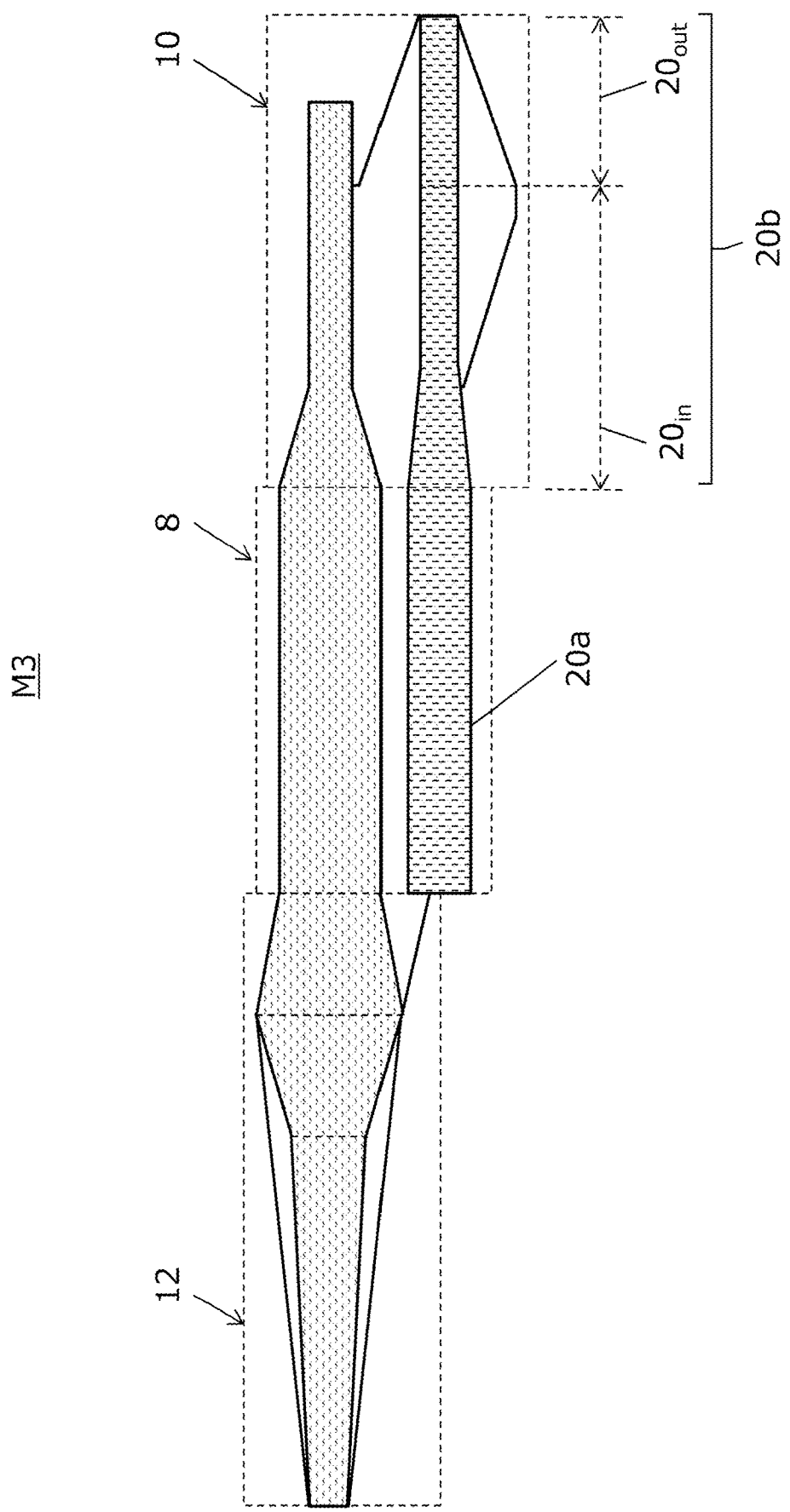
FIG. 20 is a plan view illustrating an example of a mode converter M3 according to a third modification.

FIG. 20 is a plan view illustrating an example of a mode converter M3 according to a third modification. As illustrated in FIG. 20, the outer region $20_{out}$ of the output-side second rib unit 20b is narrower than the output-side first rib unit 20a. Except for this point, the structure of the mode converter M3 according to the third modification is almost the same as the structure of the mode converter 2 described with reference to FIG. 1.

Since the width of the tip of the output-side second rib unit 20b is preferably the width of the channel waveguide 9 (see FIG. 5), the outer region $20_{out}$ may be narrower than the output-side first rib unit 20a in a case where the channel waveguide 9 is narrower than the output-side first rib unit 20a. In the example illustrated in FIG. 20, the width of the output-side second rib unit 20b is narrowed to the width of the channel waveguide 9 in the inner region $20_{in}$.

According to the third modification, even in a case where the channel waveguide 9 is narrowed than the output-side first rib unit 20a, the reflection loss at the boundary between the mode converter M3 and the channel waveguide can be suppressed.

(6-4) Fourth Modification

Figure 21:
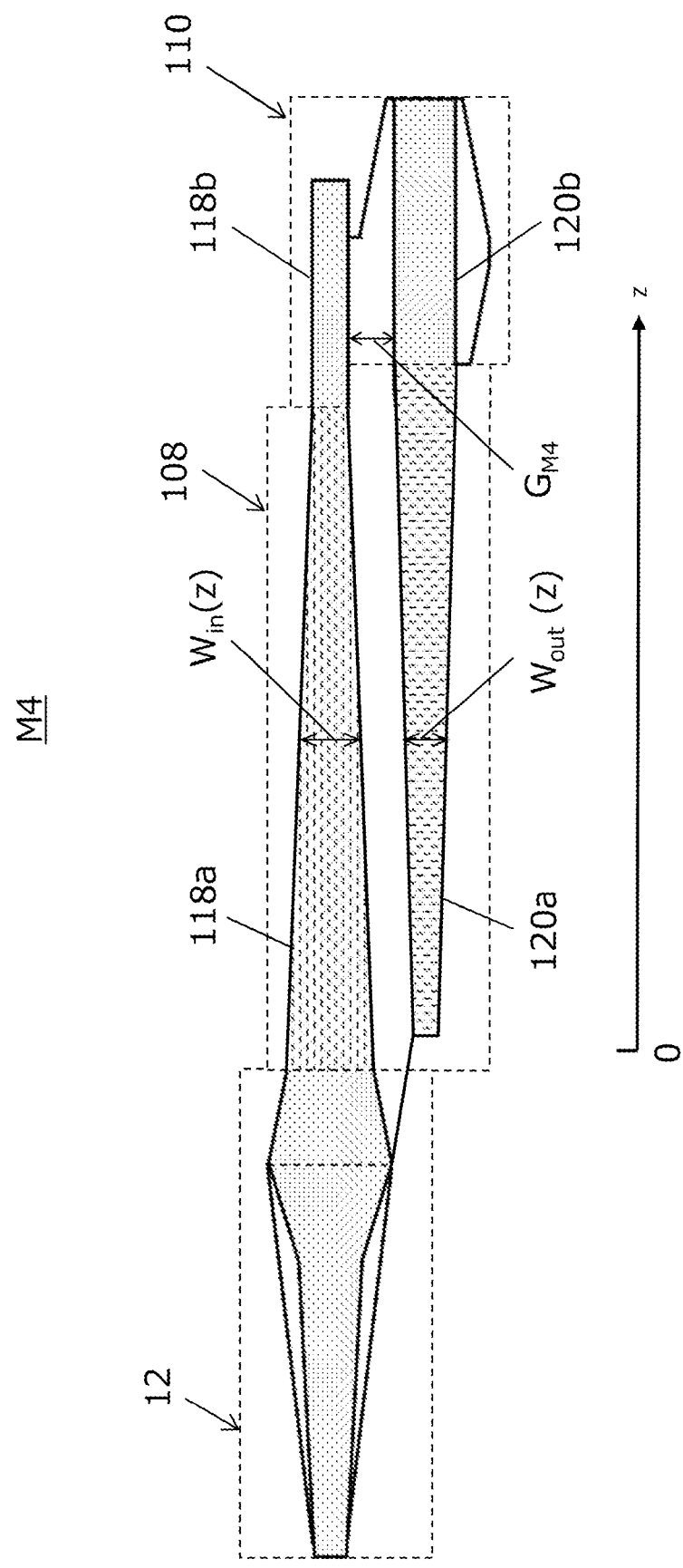
FIG. 21 is a plan view illustrating an example of a mode converter M4 according to a fourth modification.

FIG. 21 is a plan view illustrating an example of a mode converter M4 according to a fourth modification. The mode order conversion unit 8 of the mode converter 2 described with reference to FIG. 1 is a directional coupler having two rib units whose widths are different (i.e., the input-side first rib unit 18a and the output-side first rib unit 20a). By contrast, in a directional coupler according to the fourth modification, a width $W_{in}(z)$ of an input-side first rib unit 118a decreases toward the input-side second rib unit 118b, and a width $W_{out}(z)$ of an output-side first rib unit 120a increases toward an output-side second rib unit 120b (Difference 1). Here, z is a coordinate along the input-side first rib unit 118a and the output-side first rib unit 120a. In the example illustrated in FIG. 22, $W_{in}(z)$ and $W_{out}(z)$ are each a linear function of z. The gap between the input-side first rib unit 118a and the output-side first rib unit 120a is constant.

The rib channel conversion unit 10 of the mode converter 2 described with reference to FIG. 1 has the coupling region 36 in which the gap G (see FIG. 6) between the input-side second rib unit 18b and the output-side second rib unit 20b increases towards the tip of the output-side second rib unit 20b. By contrast, the rib channel conversion unit 110 of the fourth modification does not have such a region. As a result, a gap $G_{M4}$ between the input-side second rib unit 118b and the output-side second rib unit 120b is constant (Difference 2).

—Operation—

Figure 22:
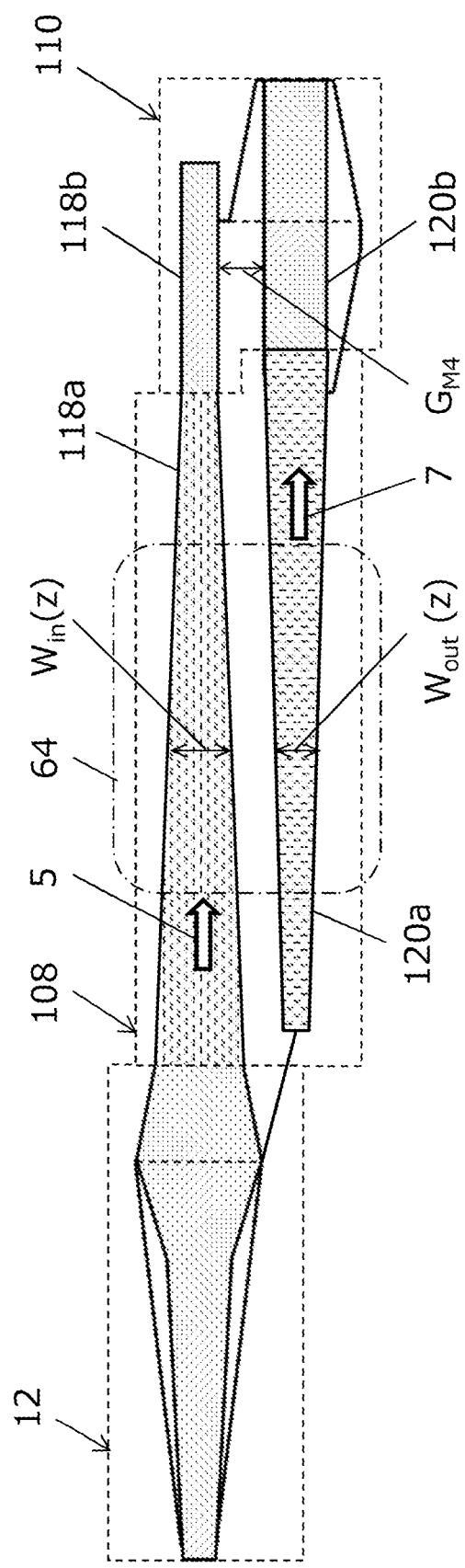
FIG. 22 is a diagram illustrating an example of the operation of a mode order conversion unit 108 of the fourth modification.

FIG. 22 is a diagram illustrating an example of the operation of a mode order conversion unit 108 of the fourth modification. The mode order conversion unit 108 of the fourth modification is configured so that the effective refractive index of the $TE_1$ light 5 propagating through the input-side first rib unit 118a and the effective refractive index of the $TE_0$ light 7 propagating through the output-side first rib unit 120a are the same at the center.

The coordinate of the positions (hereinafter referred to as the matching position) where the effective refractive indexes of the $TE_1$ light 5 propagating through the input-side first rib unit 118a and the $TE_0$ light 7 propagating through the output-side first rib unit 120a are the same is defined as zc. The width $W_{in}(zc)$, which is width of the he input-side first rib unit 118a at the matching position zc, is Wy described with reference to FIG. 12. The width $W_{out}(zc)$, which is the width of the output-side first rib unit 120a at the matching position zc, is Wx described with reference to FIG. 12.

In a specific region 64 (hereinafter referred to as the matching region) including the matching position zc, the effective refractive index of the $TE_1$ light 5 and the effective refractive index of the $TE_0$ light 7 are almost the same, so that the $TE_1$ light 5 is converted into the $TE_0$ light 7.

On the other hand, in a region on the left side of the matching region 64, the difference in the effective refractive index between the $TE_1$ light 5 and the $TE_0$ light 7 is great, so that the $TE_1$ light 5 is hardly converted into the $TE_0$ light 7. In the fourth modification, the sign of a rate of change of $W_{in}(z)$ (=$dW_{in}(z)/dz$<0) and the sign of a rate of change of $W_{out}(z)$ (=$dW_{out}(z)/dz$>0) are opposite to each other, so that such a matching region 64 is formed.

Even in a region on the right side of the matching region 64, the difference in the effective refractive index between the $TE_1$ light 5 and the $TE_0$ light 7 is great, so that the $TE_0$ light 7 does not return to the $TE_1$ light 5 in the input-side first rib unit 118a. Therefore, even if the gap between the input-side second rib unit 118b and the output-side second rib unit 120b is not widened in the rib channel conversion unit 110, the $TE_0$ light 7 does not return to the $TE_1$ light in the output-side second rib unit 118b. Thus, in the fourth modification, the gap $G_{M4}$ between the input-side second rib unit 118b and the output-side second rib unit 120b is constant (see Difference 2).

A length of each of the input-side first rib unit 118a and the output-side first rib unit 120a is preferably 25 µm to 100 µm (e.g., 50 µm). A gap between the input-side first rib unit 118a and the output-side first rib unit 120a is preferably 0.08 µm to 0.32 µm (e.g., 0.16 µm). A width of the left end of the input-side first rib unit 118a is preferably 0.7 µm to 3 µm (e.g., 1.5 µm). A width of the right end of the input-side first rib unit 118a is preferably 0.15 µm to 0.6 µm (e.g., 0.3 µm).

A width of the left end of the output-side first rib unit 120a is preferably 0.1 μm to 0.4 μm (e.g., 0.2 μm). A width of the right end of the output-side first rib unit 120a is preferably 0.2 μm to 1.0 μm (e.g., 0.48 μm).

Except for these sizes, the size of each part of the mode converter M4 according to the fourth modification is preferably the same as the size of each part of the mode converter 2 described with reference to FIG. 1.

—Suppression of Deterioration in Mode Conversion Efficiency—

Consider a case where the widths of the input-side first rib unit 118a and the output-side first rib unit 120a change from their design values due to a manufacturing error δ. To simplify the description, now consider a case where the width $W_{in}(z)$ of the input-side first rib unit 118a and the width $W_{out}(z)$ of the output-side first rib unit 120a are each a linear function of z.

A width of the input-side first rib unit 118a changed due to the manufacturing error δ is referred to as $W'_{in}(z)$. In a same manner, a width of the output-side first rib unit 120a changed due to the manufacturing error δ is referred to as $W'_{out}(z)$. The widths $W'_{in}(z)$ and $W'_{out}(z)$ are represented by Equations (1) and (2), respectively.

$$W'_{in}(z) = W_{in}(z) + \delta \quad (1)$$
$$= W_{in}(zc) - k(z - zc) + \delta$$
$$= W_{in}(zc) - k\{(z - \delta/k) - zc\}$$
$$= W_{in}(z - \delta/k)$$

$$W'_{out}(z) = W_{out}(z) + \delta \quad (2)$$
$$= W_{out}(zc) - k(z - zc) + \delta$$
$$= W_{out}(zc) - k\{(z - \delta/k) - zc\}$$
$$= W_{out}(z - \delta/k)$$

Here, k is a positive coefficient.

According to Equations (1) and (2), $W'_{in}(z)=W_{in}(z-\delta/k)$ and $W'_{out}(z)=W_{out}(z-\delta/k)$. Therefore, when the widths of the input-side first rib unit 118a and the output-side first rib unit 120a change due to the manufacturing error δ, the matching region 64 (where the effective refractive indexes of the $TE_1$ light 5 and the $TE_0$ light 7 are almost the same) is translated by δ/k along the z-axis.

The mode conversion efficiency from the $TE_1$ light 5 to the $TE_0$ light 7 does not deteriorate unless the matching region 64 protrudes from the mode order conversion unit 108 due to that translation.

The protrusion of the matching region 64 from the mode order conversion unit 108 can be easily avoided by designing the mode order conversion unit 108 to be longer. Therefore, according to the fourth modification, it is possible to suppress the deterioration in the mode conversion efficiency due to the manufacturing error.

(6-5) Fifth Modification

Figure 23:
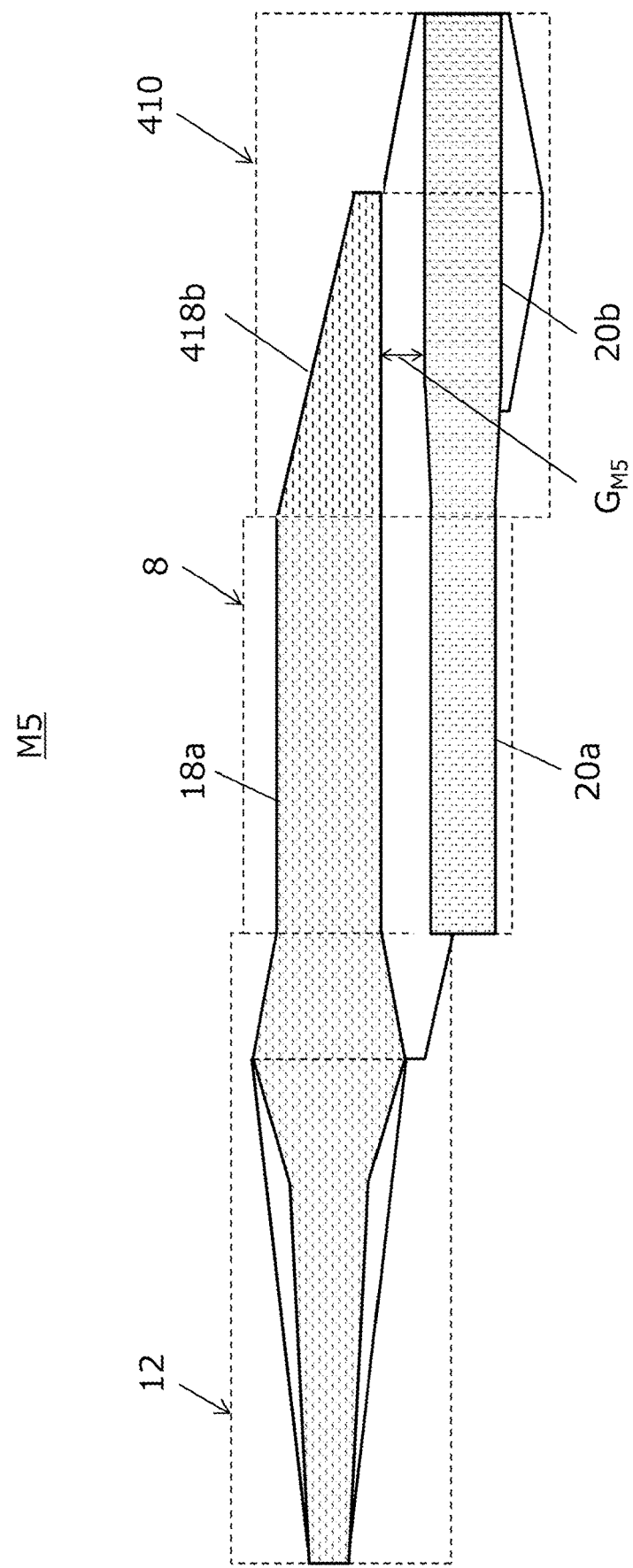
FIG. 23 is a plan view illustrating an example of a mode converter M5 according to a fifth modification.

FIG. 23 is a plan view illustrating an example of a mode converter M5 according to a fifth modification. The rib channel conversion unit 10 of the mode converter 2 described with reference to FIGS. 1 and 6 has the coupling region 36 in which the gap G (see FIG. 6) between the input-side second rib unit 18b and the output-side second rib unit 20b increases. By contrast, the mode converter M5 according to the fifth modification does not have such a region.

As illustrated in FIG. 23, an input-side second rib unit 418b of the fifth modification is a quadrangle whose upper side is inclined and whose bottom side is parallel to the output-side second rib unit 20b. Therefore, a gap $G_{M5}$ between the input-side second rib unit 418b and the output-side second rib unit 20b is almost constant.

As illustrated in FIG. 23, the width of the input-side second rib unit 418b decreases as the distance from the input-side first rib unit 18a increases. Accordingly, the effective refractive index of the $TE_1$ light in the input-side second rib unit 418b deviates from the effective refractive index of the $TE_0$ light in the output-side second rib unit 20b as the distance from the input-side first rib unit 18a increases. Therefore, the $TE_0$ light 7 propagating through the output-side second rib unit 20b does not return to the $TE_0$ light in the input-side second rib unit 418b.

(6-6) Sixth Modification

In the examples described with reference to FIGS. 1 to 23, the mode order conversion unit 8 converts the $TE_1$ light 5 into the $TE_0$ light 7. However, the mode order conversion unit 8 may convert propagating light having a mode order higher than that of the $TE_1$ light into propagating light having a mode order higher than that of the $TE_0$ light 7. For instance, the mode order conversion unit 8 may convert propagating light of the $TE_2$ mode into propagating light of the $TE_1$ mode. In this case, the polarization rotation unit 12 converts, for instance, propagating light of the $TM_1$ mode into propagating light of the $TE_2$ mode.

In other words, the mode order conversion unit 8 may convert higher-order TE light whose electric field direction is polarized so as to be parallel to the substrate 11 and whose mode order is higher than that of the fundamental mode into lower-order TE light whose electric field direction is polarized so as to be parallel to the substrate 11 and whose mode order is lower than that of the higher-order TE light. The same applies to the second and third embodiments.

In this case, the higher-order TE light is propagating light (first propagating light) propagating through the input-side first rib unit 18a. The lower-order TE light is propagating light (second propagating light) propagating through the output-side first rib unit 20a. TM light whose electric field direction is polarized so as to be orthogonal to the substrate 11 is inputted into the polarization rotation unit 12, and the inputted TM light is converted into the higher-order TE light and inputted into the mode order conversion unit 8.

According to the fifth modification, TE polarized light having a higher mode order than that of the $TE_1$ light can be converted into another TE polarized light having a lower mode order.

In the above examples, the rib channel conversion units 10, 110, and 410 have the input-side second rib units 18b, 118b, and 418b. However, when the non-converted $TE_1$ light (see "(2-3) Operation of rib channel conversion unit 10") is sufficiently weak, the rib channel conversion units 10, 110, and 410 do not have to have the input-side second rib units 18b, 118b, and 418b, respectively.

In this case, the non-converted $TE_1$ light is partially reflected by the end face of the input-side first rib unit 18a. However, even if sufficiently weak non-converted $TE_1$ light is reflected, the reflected light that propagates back through the input-side first rib unit 18a is weaker than the sufficiently weak non-converted $TE_1$ light, so that damage due to the reflected light is unlikely to occur.

In the above examples, the polarization rotation unit 12 has the sixth and seventh slab units 24f and 24g. However, when the refractive indexes of the upper cladding 6u (see FIG. 4) and the lower cladding 6l are different from each other, the polarization rotation unit 12 does not have to have the sixth and seventh slab units 24f and 24g. Even in a case the refractive indexes of the claddings are vertically asymmetrical, the TM light is converted into the TE light (see, Daoxin Dai and John E. Bowers, "Novel concept for ultra-compact polarization splitter-rotator based on silicon nanowires," Optics Express, Vol. 19, No. 11, pp. 10940-10949 (2011), and Daoxin Dai, Yongbo Tang, and John E. Bowers, "Mode conversion in tapered submicron silicon ridge optical waveguides," Optics Express, Vol. 20, No. 12, pp. 13425-13439 (2012), for instance).

In the above examples, the width of the input-side second rib unit 18b decreases as the distance from the input-side first rib unit 18a increases, except for the fourth modification. However, the width of the input-side second rib unit 18b does not have to decrease. For instance, in a case where the input-side second rib unit 18b is curved upward so that the gap between the input-side second rib unit 18b and the output-side second rib unit 20b is widened, the width of the input-side second rib unit 18b does not have to decrease. Also in this case, since the coupling coefficient between the $TE_1$ mode of the input-side second rib unit 18b and the $TE_0$ mode of the output-side second rib unit 20b becomes low, the $TE_0$ light 7 in the output-side second rib unit 20b does not return to the $TE_1$ light in the input-side second rib unit 18b.

The mode converter 2 according to the first embodiment serves as an optical polarization rotator because of including the polarization rotation unit 12. However, the mode converter 2 does not have to have the polarization rotation unit 12. In the case where the mode converter 2 does not have the polarization rotation unit 12, the mode converter 2 can be used as an optical element not being an optical polarization rotator (see, for instance, a third embodiment described later).

According to the first embodiment, since the output-side second rib unit 20b whose both side surfaces are in contact with the slab layers is provided between the output-side first rib unit 20a and the channel waveguide 9, the electric field distribution of the $TE_0$ light that is shifted toward the input-side second rib unit 18b is modified to be symmetrical in the lateral direction. This modification avoids the mismatch of the electric field distribution of the $TE_0$ light at the boundary between the mode converter 2 and the channel waveguide 9, and thus suppresses the reflection loss at the boundary between the mode converter 2 and the channel waveguide 9.

Second Embodiment

A mode converter according to a second embodiment is almost identical to the mode converter 2 according to the first embodiment. Therefore, a description of the same structure as that of the first embodiment and the like will be omitted or simplified.

(1) Structure and Operation

Figure 24:
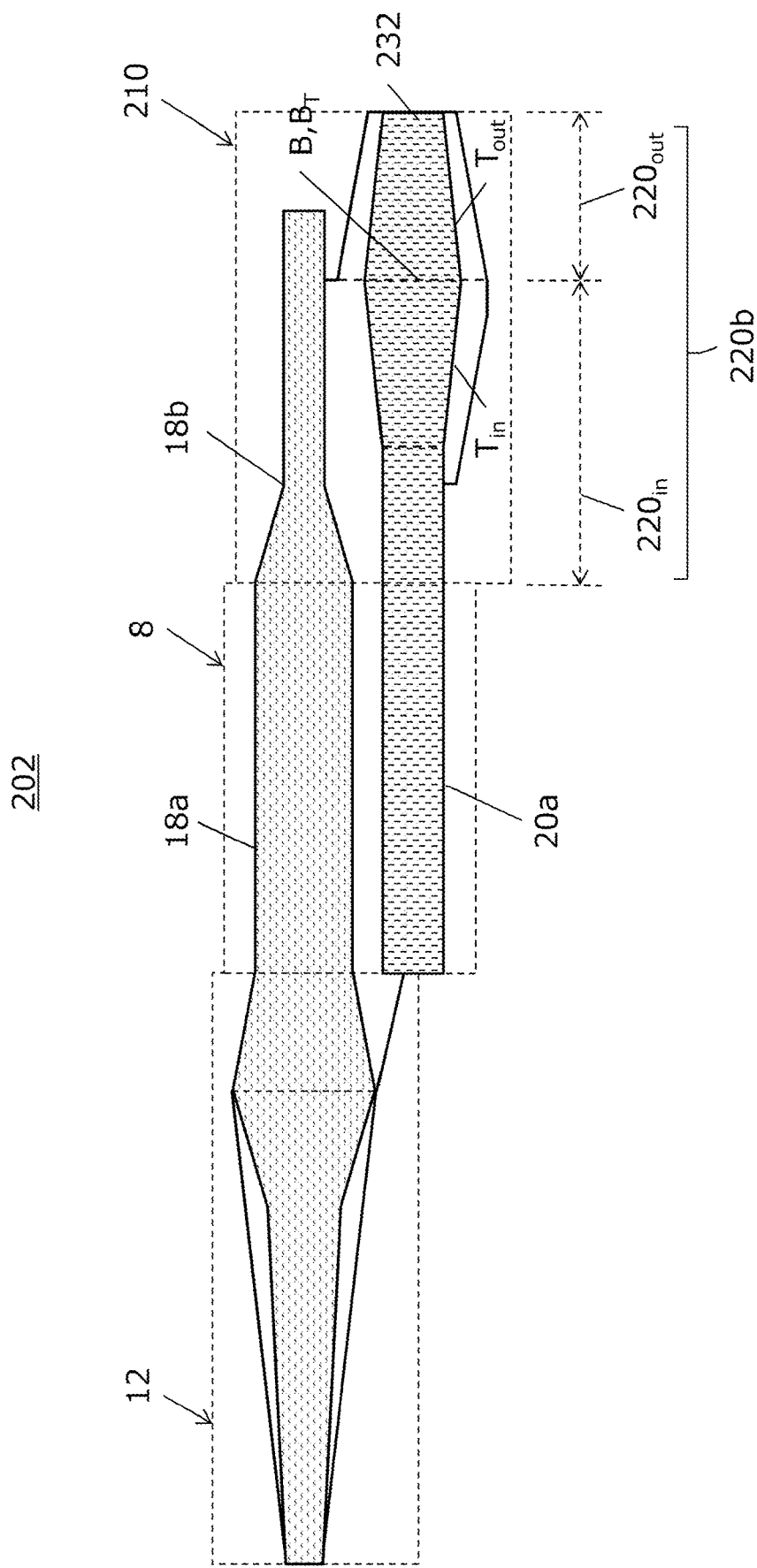
FIG. 24 is a plan view illustrating an example of a mode converter 202 according to the second embodiment.
Figure 25:
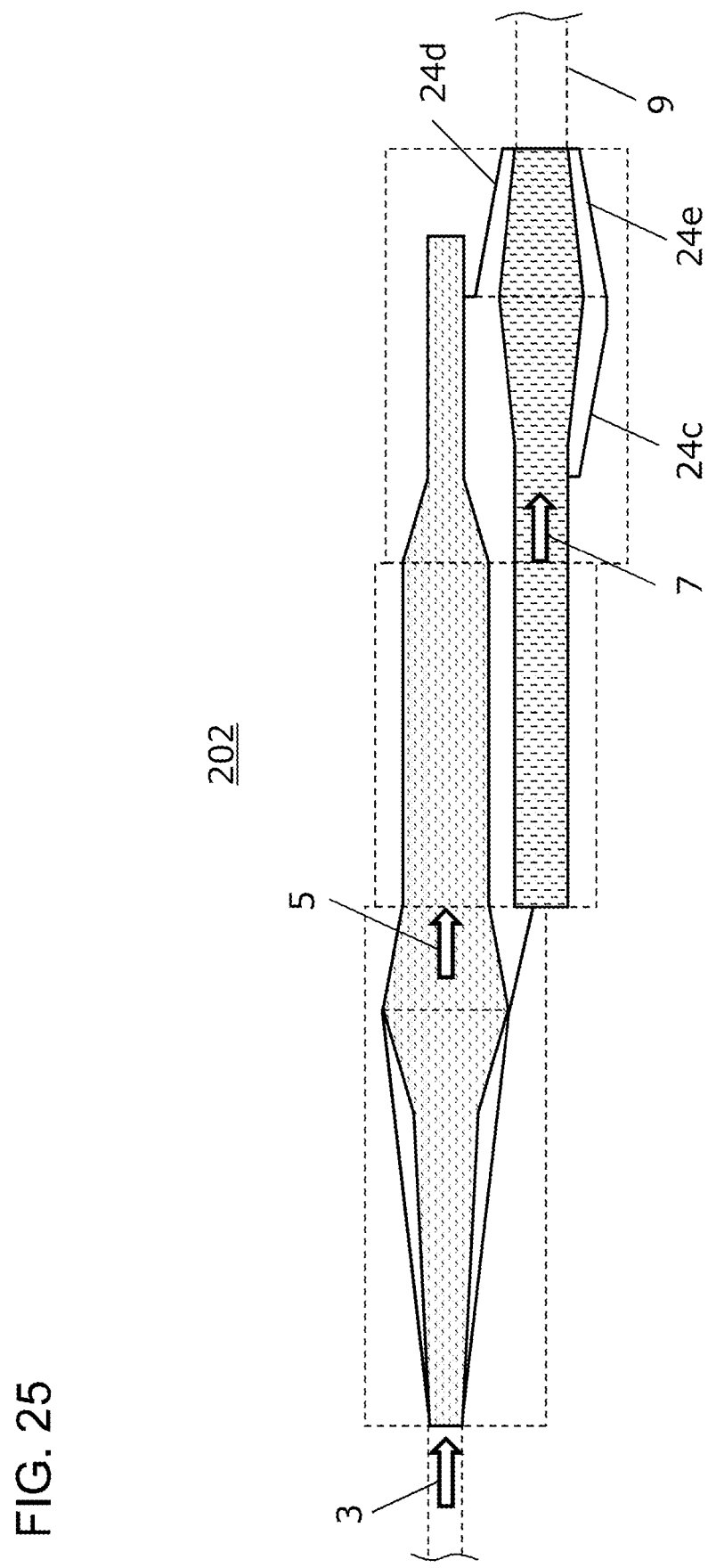
FIG. 25 is a diagram illustrating an example of an operation of the mode converter 202 according to the second embodiment.

FIG. 24 is a plan view illustrating an example of a mode converter 202 according to the second embodiment. FIG. 25 is a diagram illustrating an example of an operation of the mode converter 202 according to the second embodiment.

The width of the output-side second rib unit 20b of the mode converter 2 (see FIG. 1) according to the first embodiment is constant except for the coupling region 36 (see FIG. 6) in contact with the output-side first rib unit 20a. By contrast, a width of a center (i.e., middle part) of an output-side second rib unit 220b of the second embodiment (e.g., around a boundary B between an inner region $220_{in}$ and an outer region $220_{out}$) is wider than the widths of both ends of the output-side second rib unit 220b.

In each of the mode converters 2 and 202 of the first and second embodiments, the width of each of the tips 32 and 232 of the output-side second rib units 20b and 220b is preferably the width of the channel waveguide 9 (see FIG. 5). Therefore, the width of the output-side second rib unit 220b of the second embodiment is wider than the width of the output-side second rib unit 20b of the first embodiment in a wide region including the center (i.e., around the boundary B).

Accordingly, the output-side second rib unit 220b of the second embodiment can confine the $TE_0$ light 7 more strongly than the output-side second rib unit 20b of the first embodiment. Therefore, according to the second embodiment, a scattering loss due to side walls of the third to fifth slab units 24c to 24e and the like can be made lower than that of the mode converter 2 according to the first embodiment.

In the example illustrated in FIG. 24, the output-side second rib unit 220b includes an inner tapered unit $T_{in}$ whose width decreases toward the output-side first rib unit 20a and an outer tapered unit $T_{out}$ whose width decreases toward the tip 232. The width of the output-side second rib unit 220b at a boundary $B_T$ between the inner tapered unit $T_{in}$ and the outer tapered unit $T_{out}$ is preferably 0.3 μm to 1.3 μm (e.g., 0.65 μm). Note that FIGS. 24 and 25 illustrate a case where the boundary $B_T$ between the inner tapered unit $T_{in}$ and the outer tapered unit $T_{out}$ coincides with the boundary B between the inner region $220_{in}$ and the outer region $220_{out}$ of the output-side second rib unit 220b. However, the boundary $B_T$ and the boundary B do not have to match each other.

The width of the opposite end from the boundary $B_T$ of both ends of the inner tapered unit $T_{in}$ is preferably 0.2 μm to 1.0 μm (e.g., 0.46 μm). The width of the opposite end from the boundary $B_T$ (i.e., the tip 232 of the output-side second rib unit 220b) of both ends of the outer tapered unit $T_{out}$ is preferably 0.2 μm to 1.0 μm (e.g., 0.48 μm). Except for the above sizes, the size of each part of the mode converter 202 is the same as the size of each part of the mode converter 2 according to the first embodiment described with reference to FIG. 17.

(2) Modification

Figure 26:
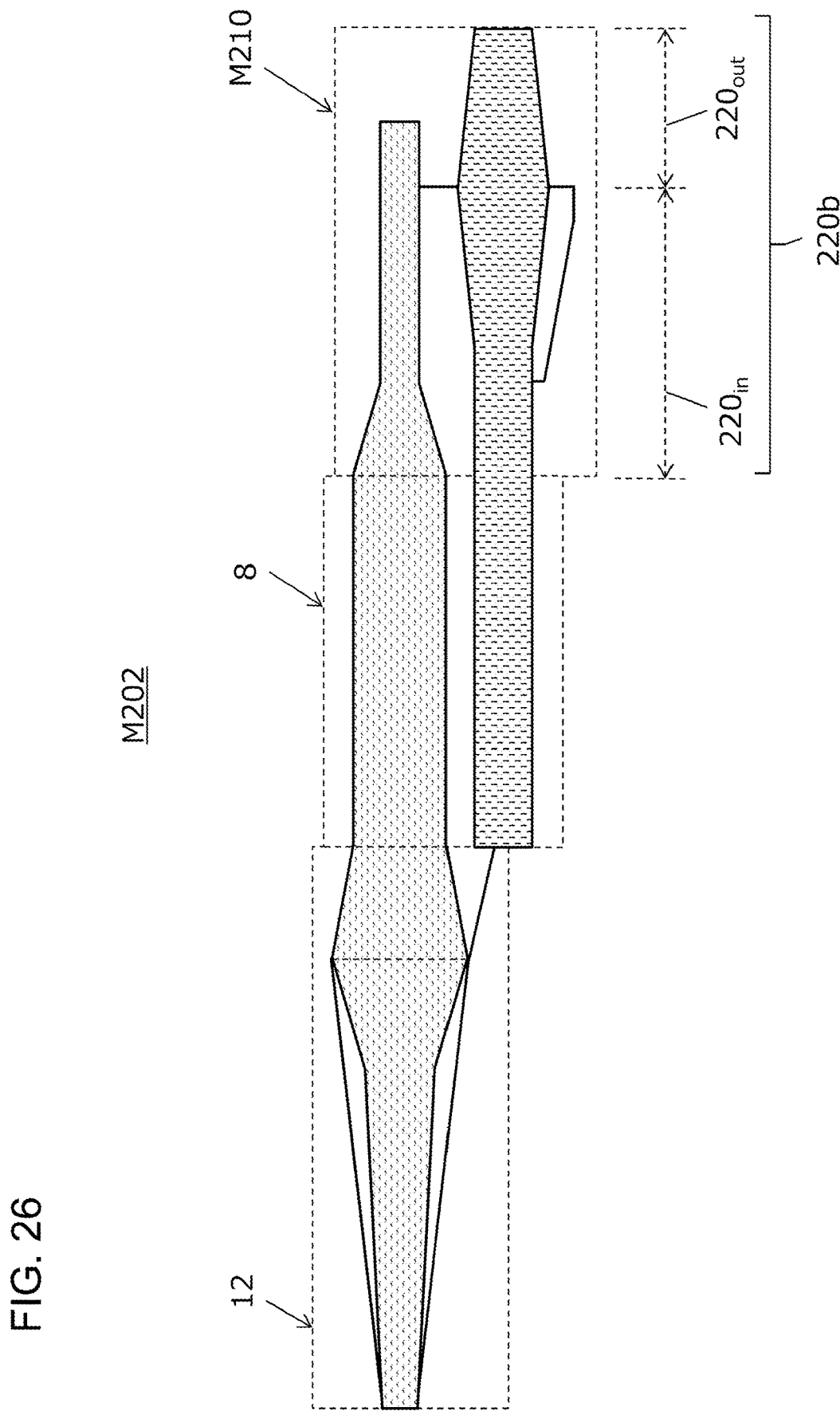
FIG. 26 is a plan view illustrating an example of a mode converter M202 according to a modification.

FIG. 26 is a plan view illustrating an example of a mode converter M202 according to a modification. The structure of the mode converter M202 is almost the same as the structure of the mode converter 202 described with reference to FIG. 24 except that it does not have the fourth and fifth slab units 24d and 24e.

Since the mode converter M202 does not have the fourth and fifth slab units 24d and 24e, the $TE_0$ light 7 propagating through the output-side second rib unit 220b is reflected when entering the outer region $220_{out}$ from the inner region $220_{in}$. However, it is easy to suppress this reflection by optimizing the converter structure (e.g., the width and thickness of the core 4) (see "(6-1) First Modification" of the first embodiment).

According to the modification, the converter structure can be simplified, so that the manufacturing process can be simplified.

According to the second embodiment, the channel rib conversion unit 210 can suppress the reflection loss at the boundary between the mode converter 202 and the channel waveguide 9, as in the mode converter 2 of the first embodiment. Further, according to the second embodiment, it is possible to make sure to confine the $TE_0$ light 7 in the wide output-side second rib unit 220b and thus to suppress the scattering loss due to the side walls of the third to fifth slab units 24c to 24e and the like.

Third Embodiment

Figure 27:
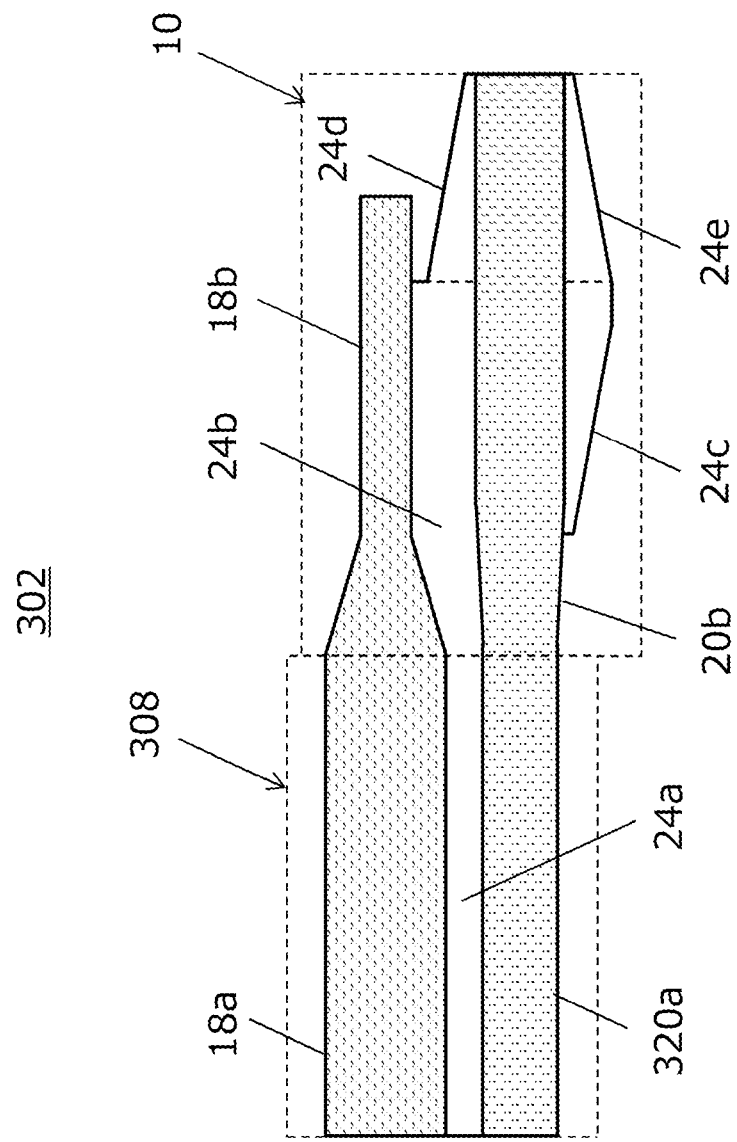
FIG. 27 is a plan view illustrating an example of a mode converter 302 according to a third embodiment.
Figure 28:
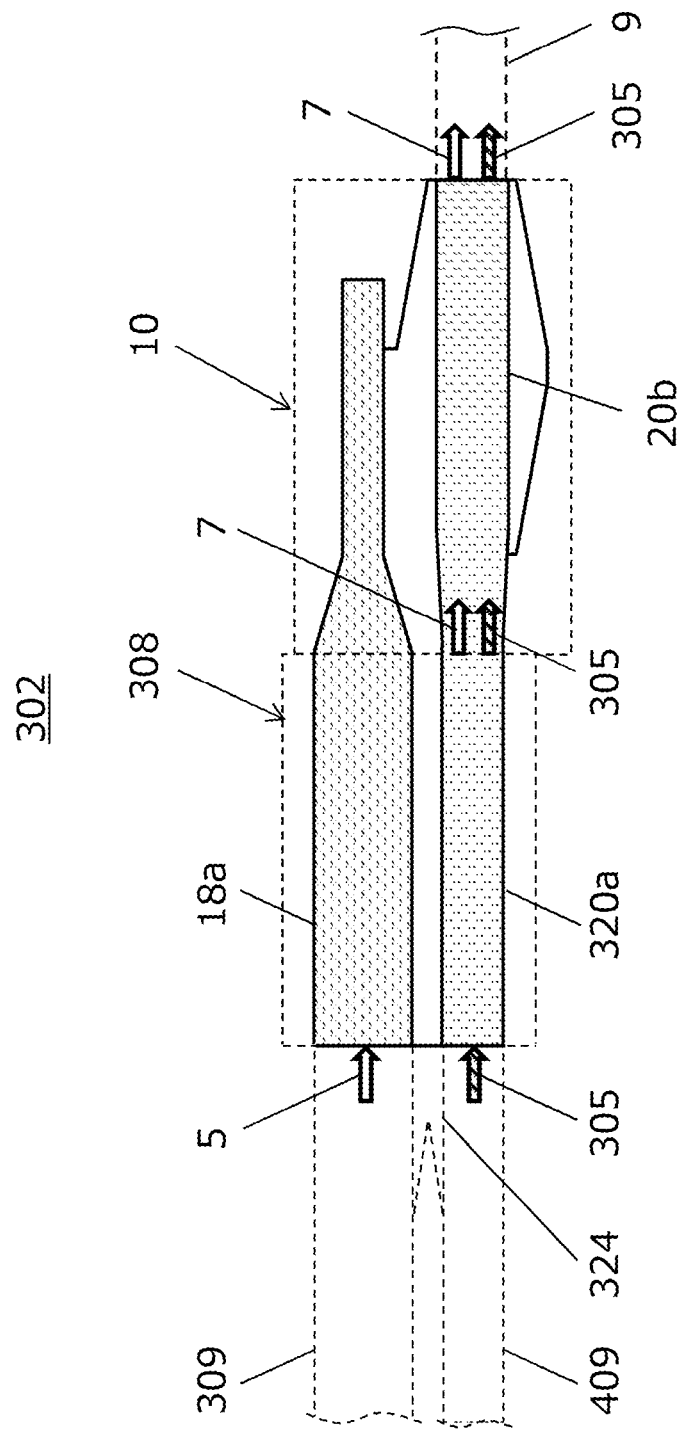
FIG. 28 is a diagram illustrating an example of an operation of the mode converter 302 according to the third embodiment.

FIG. 27 is a plan view illustrating an example of a mode converter 302 according to a third embodiment. FIG. 28 is a diagram illustrating an example of an operation of the mode converter 302 according to the third embodiment. The mode converter 302 according to the third embodiment is almost identical to the mode converter 2 according to the first embodiment. Therefore, a description of the same structure as that of the first embodiment and the like will be omitted or simplified.

(1) Structure

As illustrated in FIG. 27, the mode converter 302 according to the third embodiment does not include the polarization rotation unit 12. Further, a mode order conversion unit 308 of the mode converter 302 is configured so that the effective refractive index of the $TE_1$ mode of an output-side first rib unit 320a is not the same as the effective refractive index of any TE mode (e.g., $TE_1$ mode) of the input-side first rib unit 18a. Except for these points, the structure of the mode converter 302 according to the third embodiment is almost the same as the structure of the mode converter 2 according to the first embodiment.

(2) Operation

The $TE_1$ light 5 (see FIG. 28) and $TE_1$ light 305 different from the $TE_1$ light 5 are inputted into the mode converter 302 according to the third embodiment so that the $TE_1$ light 305 and $TE_0$ light 7 into which the $TE_1$ light 5 is converted are multiplexed there. The $TE_1$ light 5 and the $TE_1$ light 305 are propagating light of the $TE_1$ mode. The $TE_0$ light 7 is propagating light of the $TE_0$ mode.

The $TE_1$ light 5 is inputted into the input-side first rib unit 18a via a channel waveguide 309. In the same manner as the first embodiment, the effective refractive index of the $TE_1$ light 5 in the input-side first rib unit 18a is almost the same as the effective refractive index of the $TE_0$ light 7 in the output-side first rib unit 320a. Accordingly, the $TE_1$ light 5 is converted into the $TE_0$ light 7 and outputted from the output-side second rib unit 20b to the channel waveguide 9.

The $TE_1$ light 305 is inputted into the output-side first rib unit 320a via a channel waveguide 409. As described above, the effective refractive index of the $TE_1$ mode of the output-side first rib unit 320a is different from the effective refractive index of any TE mode of the input-side first rib unit 18a. Accordingly, the $TE_1$ light 305 intactly passes through the output-side first rib unit 320a, and is outputted from the output-side second rib unit 20b to the channel waveguide 9.

As a result, $TE_1$ light 305 and the $TE_0$ light 7 into which the $TE_1$ light 5 is converted are multiplexed and outputted together from the output-side second rib unit 20b. Note that in the example illustrated in FIG. 28, a slab layer 324 having a V-shaped tip (see the first embodiment) is provided between the channel waveguides 309 and 409 to suppress the reflection loss at the boundary between the mode order conversion unit 308 and the channel waveguides 309 and 409 on the input-side.

As described above, the mode converter 302 according to the third embodiment can multiplex TE polarized light having different mode orders.

(3) Application Examples

Figure 29:
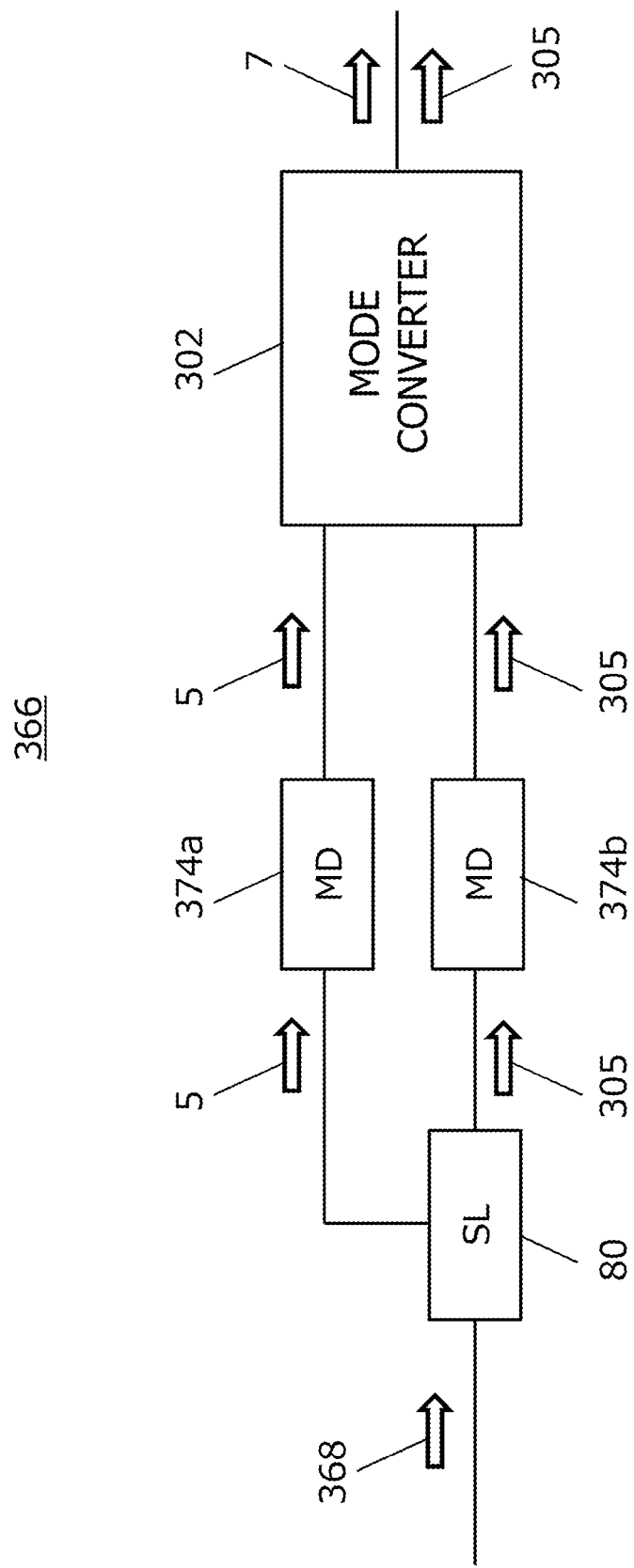
FIG. 29 is a block diagram illustrating an example of a mode multiplexing transmitter 366 using the mode converter 302.

FIG. 29 is a block diagram illustrating an example of a mode multiplexing transmitter 366 using the mode converter 302. The mode multiplexing transmitter 366 can be used, for instance, for inter-element communication (i.e., interconnection) of a silicon photonics device in which optical elements are integrated on an SOI substrate.

When $TE_1$ light 368 (i.e., light of $TE_1$ mode) is inputted into the mode multiplexing transmitter 366, the $TE_1$ light 368 is splitted into the $TE_1$ light 5 and the $TE_1$ light 305 by the optical splitter 80. The $TE_1$ light 5 and the $TE_1$ light 305 are modulated by light modulators 374a and 374b, respectively.

The modulated $TE_1$ light 5 is inputted into the input-side first rib unit 18a of the mode converter 302 and converted into the $TE_0$ light 7. On the other hand, the modulated $TE_1$ light 305 is inputted into the output-side first rib unit 320a of the mode converter 302 and is intactly outputted. Accordingly, the mode converter 302 outputs mode-multiplexed signal light (i.e., the modulated $TE_0$ light 7 and the modulated $TE_1$ light 305).

The mode converter 302 may be applied to a device other than the mode multiplexing transmitter 366. For instance, the mode converter 302 may be applied to a mode order converter that converts $TE_0$ mode propagating light into $TE_1$ mode light.

According to the third embodiment, the mode converter 302 can convert the mode order of the propagating light while suppressing the reflection loss at the boundary between the mode converter 302 and the channel waveguide 9 by means of the channel rib conversion unit 10, as in the mode converter 2 of the first embodiment.

According to the first to third embodiments, it is possible to suppress a reflection loss at a boundary between a channel waveguide and a mode converter that includes an asymmetrical directional coupler or the like and that converts higher-order mode propagating light (e.g., $TE_1$ light) into lower-order mode propagating light (e.g., $TE_0$ light).

Although the embodiments of the present invention have been described above, the first to third embodiments are examples, and are not restrictive. For instance, in the above examples, the mode order conversion unit converts higher-order TE light into lower-order TE light. However, the mode order conversion unit may convert the lower-order TE light into the higher-order TE light.

In the above examples, the mode order conversion unit converts the mode order of the TE mode propagating light. However, the mode order conversion unit may convert the mode order of TM mode propagating light.

In the above examples, the material of the core 4 is Si. However, the material of the core 4 may be a material other than Si. The material of the core 4 may be, for instance, a compound semiconductor, e.g., InGaAs.

In the above examples, the material of the cladding 6 is $SiO_2$. However, the material of the cladding 6 may be a material other than $SiO_2$. The material of the cladding 6 may be, for instance, a compound semiconductor, e.g., InP.

In the above examples, the material of the substrate 11 is Si. However, the material of the substrate 11 may be a material other than Si. The material of the substrate 11 may be, for instance, a compound semiconductor, e.g., InP.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mode converter comprising:
   a substrate;
   a cladding on the substrate; and
   a core surrounded by the cladding, wherein
   the core has a higher refractive index than that of the cladding and includes: a mode order conversion unit configured to convert first propagating light into second propagating light of which mode order is different from a mode order of the first propagating light, and a rib channel conversion unit configured to output the second propagating light to outside;
   the mode order conversion unit includes: an input-side first rib unit into which the first propagating light is inputted; an output-side first rib unit that extends along the input-side first rib unit and that has a side surface on an opposite side from the input-side first rib unit, the side surface being covered with the cladding from a lower end thereof to an upper end thereof; and a first slab unit arranged between the input-side first rib unit and the output-side first rib unit, the first slab unit being thinner than the input-side first rib unit and the output-side first rib unit; and
   the rib channel conversion unit includes: an output-side second rib unit that is in contact with the output-side first rib unit and that outputs the second propagating light; a second slab unit that is in contact with the first slab unit and a side surface of the output-side second rib unit, and that is thinner than the output-side second rib unit; and a third slab unit that is in contact with another side surface of the output-side second rib unit and that is thinner than the output-side second rib unit.

2. The mode converter according to claim 1, wherein a width of the third slab unit increases toward one end that is one of both ends of the output-side second rib unit and that is on an opposite side from the output-side first rib unit.

3. The mode converter according to claim 1, wherein
   the output-side second rib unit includes an inner region in contact with the output-side first rib unit and an outer region in contact with the inner region; and
   the second slab unit and the third slab unit are in contact with the inner region.

4. The mode converter according to claim 3, wherein
   the rib channel conversion unit further includes: a fourth slab unit that is in contact with the second slab unit and a side surface of the outer region, and that is thinner than the output-side second rib unit; and a fifth slab unit that is in contact with the third slab unit and another side surface of the outer region, and that is thinner than the output-side second rib unit; and wherein
   a width of each of the fourth slab unit and the fifth slab unit decreases toward one end that is one of both ends of the output-side second rib unit and that is on an opposite side from the output-side first rib unit.

5. The mode converter according to claim 1, wherein a width of a center of the output-side second rib unit is wider than widths of both ends of the output-side second rib unit.

6. The mode converter according to claim 1, wherein
   the first propagating light is higher-order TE light of which electric field direction is polarized so as to be parallel to the substrate and of which mode order is higher than that of the fundamental mode;
   the second propagating light is lower-order TE light of which electric field direction is polarized so as to be parallel to the substrate and of which mode order is lower than that of the higher-order TE light; and
   the mode converter further comprising a polarization rotation unit into which TM light of which electric field direction is polarized so as to be orthogonal to the substrate is inputted, the polarization rotation unit being configured to convert the inputted TM light into the higher-order TE light.

7. The mode converter according to claim 1, wherein
   the first propagating light is inputted into the input-side first rib unit, and
   the output-side first rib unit inputs the second propagating light into the output-side second rib unit.

8. The mode converter according to claim 1, wherein the output-side second rib unit is coupled to a channel waveguide having a core of which cross section is rectangular.

9. The mode converter according to claim 1, further comprising an input-side second rib unit that extends along the output-side second rib unit and that is in contact with the input-side first rib unit, wherein
   a gap between the input-side second rib unit and the output-side second rib unit increases in a region in contact with the mode order conversion unit toward one end that is one of both ends of the output-side second rib unit and that is on an opposite side from the output-side first rib unit.

10. The mode converter according to claim 1, wherein the mode order conversion unit is an asymmetrical directional coupler in which a width of the input-side first rib unit is different from a width of the output-side first rib unit.

11. The mode converter according to claim 9, wherein the mode order conversion unit is a directional coupler in which a width of the input-side first rib unit decreases toward the input-side second rib unit and a width of the output-side first rib unit increases toward the output-side second rib unit.

* * * * *